(12) United States Patent
Okpokowuruk et al.

(10) Patent No.:  US 12,624,686 B2
(45) Date of Patent:  May 12, 2026

(54) BATTERY-OPERATED RECIPROCATING PUMP FOR LUBRICANTS

(71) Applicants: Alemite LLC, Fort Mill, SC (US); Lincoln Industrial Corporation, St. Louis, MO (US)

(72) Inventors: Paul Okpokowuruk, Piney Flats, TN (US); Viktor Alekseyev, St. Louis, MO (US); Scott Sanders, Arnold, MO (US)

(73) Assignees: Alemite LLC, Fort Mill, SC (US); Lincoln Industrial Corporation, St. Louis, MO (US)

( * ) Notice: Subject to any disclaimer, the term of this patent is extended or adjusted under 35 U.S.C. 154(b) by 532 days.

(21) Appl. No.: 18/050,173

(22) Filed: Oct. 27, 2022

(65) Prior Publication Data

US 2024/0141880 A1      May 2, 2024

(51) Int. Cl.
　*F04B 9/04*　　　(2006.01)
　*F04B 17/03*　　(2006.01)
　　(Continued)

(52) U.S. Cl.
　CPC .............. *F04B 9/045* (2013.01); *F04B 17/03* (2013.01); *F04B 23/028* (2013.01);
　　(Continued)

(58) Field of Classification Search
　CPC .. F04B 9/02; F04B 9/045; F04B 17/03; F04B 23/028; F04B 49/06; F04B 49/20;
　　(Continued)

(56) References Cited

U.S. PATENT DOCUMENTS

| | | | | |
|---|---|---|---|---|
| 1,816,821 | A | * | 8/1931 | Bassett .................. F16N 13/08 |
| | | | | 222/72 |
| 2,296,492 | A | * | 9/1942 | Begley, Sr. .......... F04B 53/103 |
| | | | | 137/902 |

(Continued)

FOREIGN PATENT DOCUMENTS

| | | | | |
|---|---|---|---|---|
| EP | 2818718 A1 | * | 12/2014 | .............. F04B 45/00 |

OTHER PUBLICATIONS

"Dyna-Star® HP and HF Pump"; Instructions manual No. 332514P EN; 2013; pp. 1-46; Graco Inc. and Subsidiaries, Minneapolis 55440-1441, USA.

(Continued)

*Primary Examiner* — Charles G Freay
*Assistant Examiner* — Joseph S. Herrmann
(74) *Attorney, Agent, or Firm* — J-TEK LAW PLLC; Scott T. Wakeman; Mark A. Ussai

(57)　　　　　　ABSTRACT

A portable reciprocating pump assembly delivers lubricant from a reservoir and includes a housing mountable on the reservoir and a pumping tube assembly for directing lubricant from the reservoir and into the housing. The tube assembly has a reciprocating plunger and a shovel assembly attached to the lower end of the plunger and having a disk member and a valve. A drive mechanism for operating the pumping tube assembly is disposed within the housing and includes a drive shaft and a cam mounted eccentrically on the shaft and disposed within an opening of a follower. The follower is coupled with the plunger such that rotation of the drive shaft reciprocates the plunger along a vertical axis. A motor is connected with the drive shaft and actuates the drive mechanism and a battery provides power to the motor such that the pump assembly operates without connection to a separate power source.

22 Claims, 18 Drawing Sheets

(51) Int. Cl.
| | |
|---|---|
| *F04B 23/02* | (2006.01) |
| *F04B 53/10* | (2006.01) |
| *F04B 53/16* | (2006.01) |
| *F16N 13/06* | (2006.01) |

(52) U.S. Cl.
CPC ............ *F04B 53/103* (2013.01); *F04B 53/16* (2013.01); *F04B 9/042* (2013.01); *F16N 2013/063* (2013.01)

(58) Field of Classification Search
CPC ...... F04B 53/103; F04B 53/126; F04B 9/042; F04B 53/16; F04D 19/22; F16N 11/00; F16N 2013/063; Y10T 137/7861–7865
USPC .............. 417/260, 262; 137/516.15, 516.17, 137/516.19, 516.21, 516.23
See application file for complete search history.

(56) References Cited

U.S. PATENT DOCUMENTS

| | | | | | |
|---|---|---|---|---|---|
| 3,502,029 | A | * | 3/1970 | Halladay | F04B 53/164 |
| | | | | | 417/415 |
| 5,228,842 | A | * | 7/1993 | Guebeli | F04B 53/162 |
| | | | | | 277/530 |
| 7,549,847 | B1 | * | 6/2009 | McClatchey | F04B 9/02 |
| | | | | | 417/15 |
| 7,878,081 | B2 | * | 2/2011 | Sundheim | F04B 41/02 |
| | | | | | 417/399 |
| 9,140,246 | B2 | | 9/2015 | Conley et al. | |
| 9,239,044 | B2 | | 1/2016 | Conley et al. | |
| 9,341,173 | B2 | | 5/2016 | Laughlin et al. | |
| 11,002,271 | B2 | | 5/2021 | Horning et al. | |
| 11,333,137 | B2 | | 5/2022 | Jurmu et al. | |
| 2015/0050169 | A1 | * | 2/2015 | Horie | B08B 3/026 |
| | | | | | 417/410.1 |
| 2017/0198690 | A1 | * | 7/2017 | Johnston | B05B 9/0413 |
| 2018/0030967 | A1 | * | 2/2018 | Sulzer | F04B 19/22 |
| 2021/0372387 | A1 | | 12/2021 | Larsen et al. | |
| 2022/0065396 | A1 | * | 3/2022 | Conley | F04B 53/16 |
| 2022/0213891 | A1 | | 7/2022 | Thompson et al. | |
| 2022/0220950 | A1 | * | 7/2022 | Janecek | B05B 9/00 |

OTHER PUBLICATIONS

"Dyna-Star™ Hydraulic Reciprocator and Pump"; Instructions manual No. 308156T EN; 2019; pp. 1-26; Graco Inc. and Subsidiaries, Minneapolis 55440-1441, USA.

* cited by examiner

BATTERY-OPERATED RECIPROCATING PUMP FOR LUBRICANTS

BACKGROUND OF THE INVENTION

The present invention relates to pumps, and more particularly to reciprocating lubricant pumps.

Pumps for pumping lubricants are well known and include a variety of different types. One known type is commonly referred to as a "bucket pump" which typically includes a housing mounted on the top of a lubricant reservoir and a reciprocating pumping tube assembly connected with the housing and extending downwardly into the reservoir. The pumping tube has a ram or plunger that reciprocally displaces relative to the housing to displace lubricant into and upwardly within the tube assembly so as to be directed thereafter through one or more outlets of the housing.

SUMMARY OF THE INVENTION

In one aspect, the present invention is a reciprocating pump assembly for delivering lubricant from a reservoir, the reservoir having a body defining an interior storage chamber for containing a quantity of lubricant and a cover attached to an upper end of the body. The pump assembly comprises a housing mountable on the reservoir cover and having a lubricant chamber with an outlet and a drive chamber spaced from the lubricant chamber. A pumping tube assembly has an upper end coupled with the housing and a lower end disposeable within the reservoir storage chamber, the pumping tube assembly including an elongated plunger configured to linearly displace along a plunger axis so as to displace lubricant within the storage chamber to the housing lubricant chamber and through the housing outlet. A drive mechanism is disposed at least partially within the housing drive chamber and is configured to drive the plunger to reciprocate along the plunger axis. An electric motor is connected with the housing and has a rotatable shaft coupled with the drive mechanism such that rotation of the motor shaft actuates the drive mechanism. Further, a battery is electrically connected with the motor and mounted on the motor or on the housing, the battery providing electrical energy to the motor such that the pump assembly operates without connection to a power source separate from the pump assembly.

In another aspect, the present invention is again a reciprocating pump assembly for delivering lubricant from a reservoir, the reservoir having a body defining an interior storage chamber for containing a quantity of lubricant and a cover attached to an upper end of the body. The pump assembly comprises a housing mountable on the reservoir cover and having a lubricant chamber with an outlet and a drive chamber spaced from the lubricant chamber. A pumping tube assembly has an upper end coupled with the housing and a lower end disposeable within the reservoir storage chamber, the pumping tube assembly including an elongated plunger configured to linearly displace along a plunger axis so as to displace lubricant within the storage chamber to the housing lubricant chamber and through the housing outlet. An electric motor is connected with the housing and has a rotatable shaft. A drive mechanism is disposed at least partially within the housing drive chamber and includes a drive shaft coupled with the motor shaft so as to be rotatable about a drive axis extending longitudinally through the drive shaft, the drive axis extending perpendicular to a plane containing the plunger axis. A cam is mounted on the drive shaft and has an outer circumferential camming surface extending eccentrically about the drive axis, and a follower is disposed within the housing drive chamber and coupled with the plunger, the follower having an opening defined by an enclosed inner surface. The cam is disposed within the follower opening such that the camming surface slides along the follower inner surface as the cam pushes the follower to reciprocate along the plunger axis when the drive shaft rotates the cam about the drive axis.

In a further aspect, the present invention is yet again a reciprocating pump assembly for delivering lubricant from a reservoir, the reservoir having a body defining an interior storage chamber for containing a quantity of lubricant and a cover attached to an upper end of the body. The pump assembly comprises a housing mountable on the reservoir cover and having a lubricant chamber with an outlet and a drive chamber spaced from the lubricant chamber. A drive mechanism is disposed at least partially within the housing drive chamber and an electric motor is connected with the housing and has a rotatable shaft coupled with the drive mechanism such that rotation of the motor shaft actuates the drive mechanism. A pumping tube assembly includes an elongated tubular body, the tubular body having an upper end fixedly attached to the housing and a lower end disposeable within the reservoir storage chamber, and an elongated plunger disposed within the tubular body so as to define a lubricant passage between the plunger and the tubular body. The plunger has a lower end and an upper end coupled with the drive mechanism such that actuation of the drive mechanism reciprocates the plunger along a plunger axis. Further, a shovel assembly includes a circular disk fixedly attached to the lower end of the plunger and has at least one axial opening and an annular valve slidably disposed about the plunger and having at least one axial opening. The valve is disposeable against the disk to prevent lubricant flow through the at least one disk opening when the plunger displaces in a first, upward direction along the plunger axis so as to displace lubricant within the lubricant passage into the lubricant chamber and out of the housing outlet. The valve is alternatively spaceable from the disk so as to permit lubricant flow from the reservoir storage chamber through the at least one disk opening and the at least one valve opening and into the lubricant passage when the plunger displaces in a second, downward direction along the plunger axis.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 13, are each a portion of FIG. 12 depicting a first position of a slidable ring gear in FIG. 13A and a second position of the slidable ring gear in FIG. 13B;

DETAILED DESCRIPTION OF THE INVENTION

Figure 1:
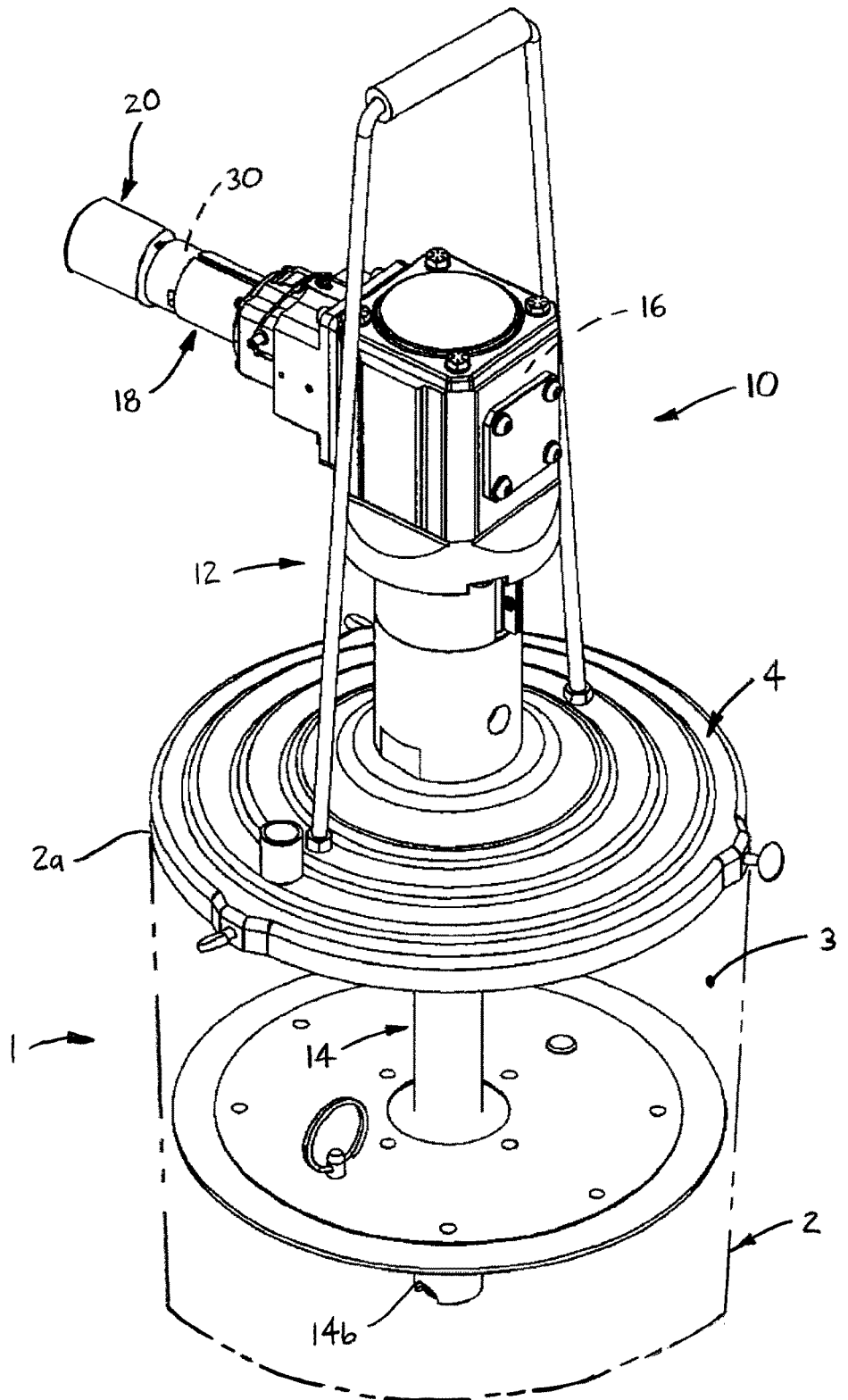
FIG. 1 is perspective view of a pump assembly in accordance with the present invention, shown mounted on a cover of a lubricant reservoir.
Figure 2:
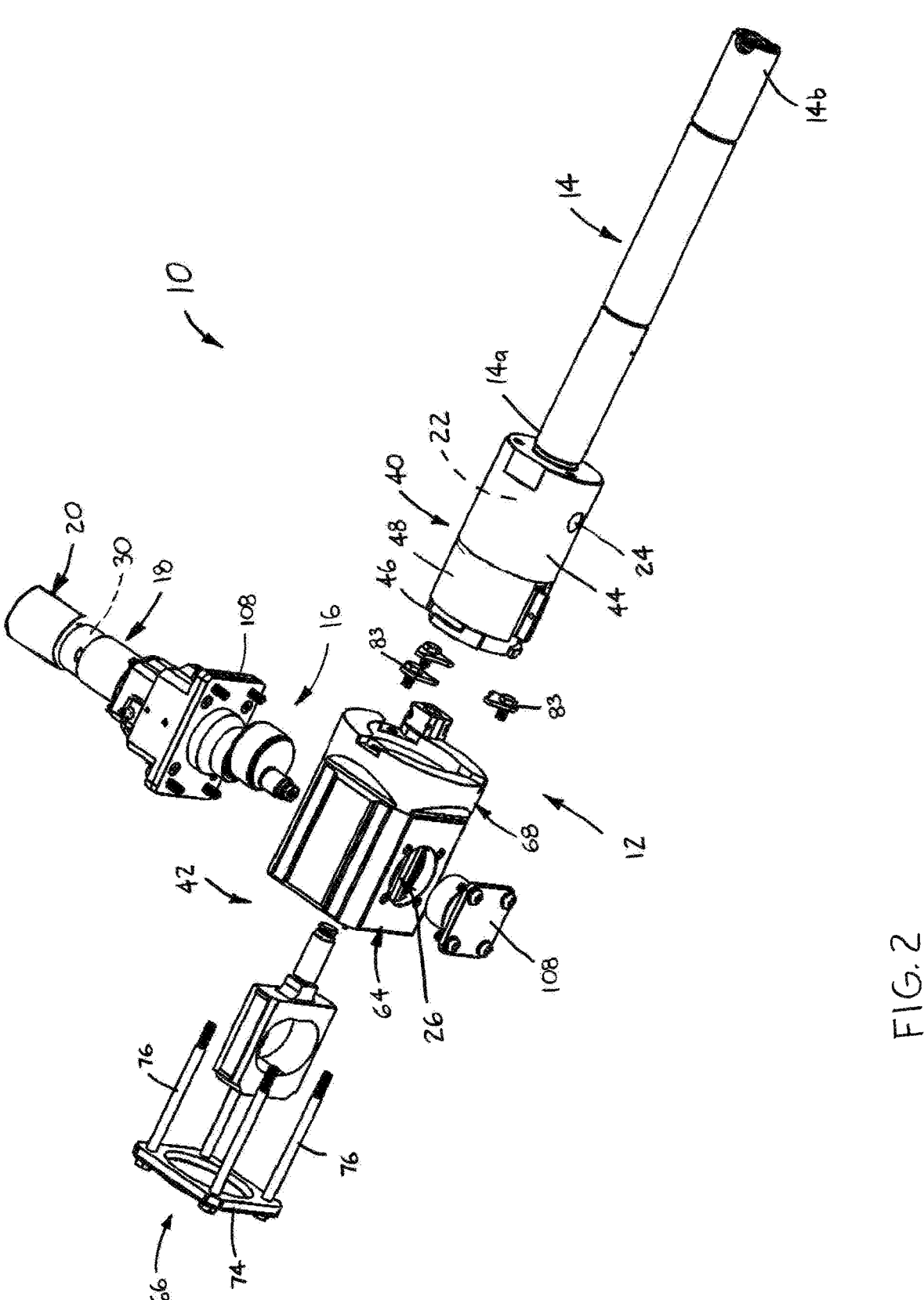
FIG. 2 is an exploded perspective view of the pump assembly.
Figure 3:
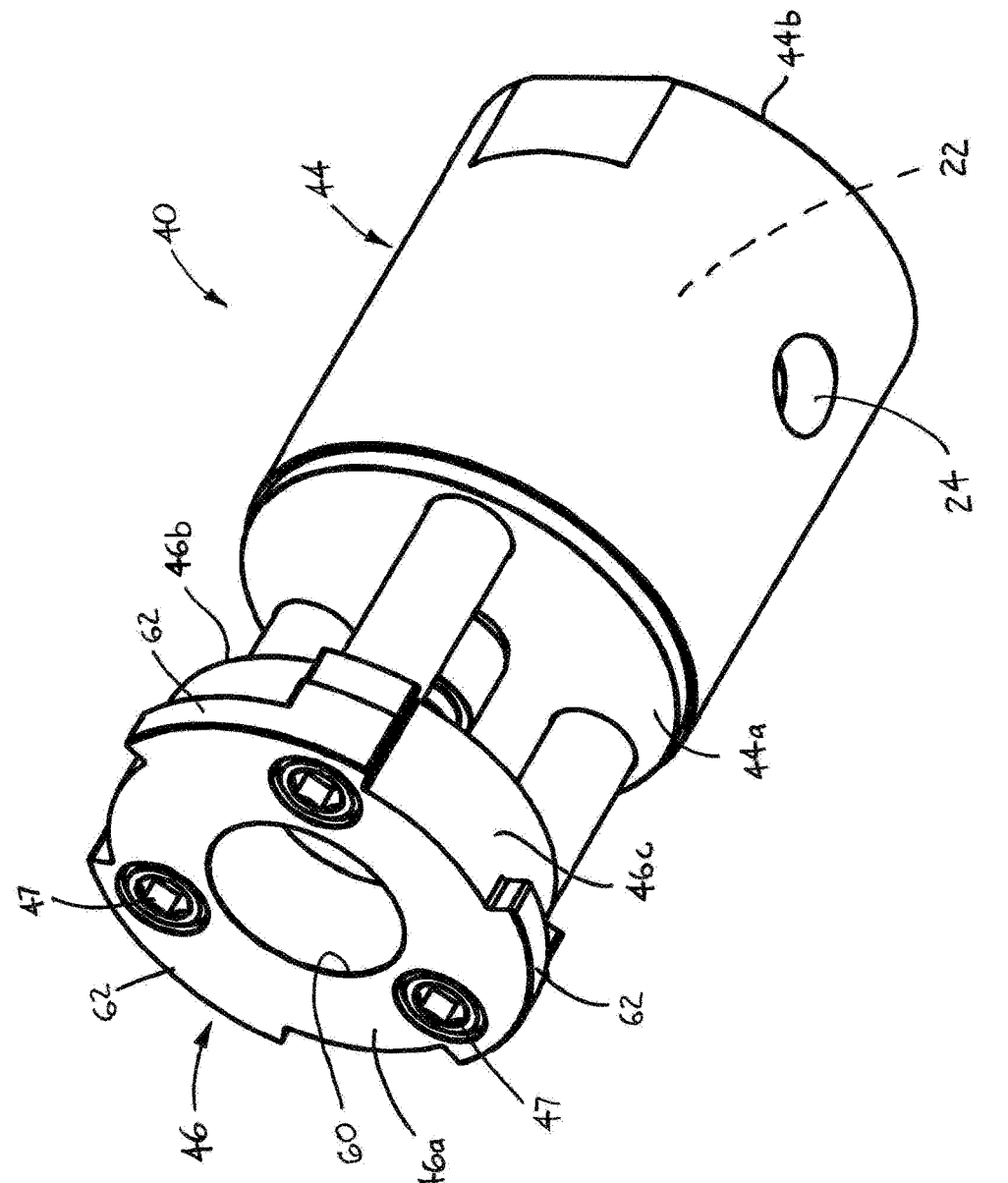
FIG. 3 is a perspective view of a housing lower member.
Figure 4:
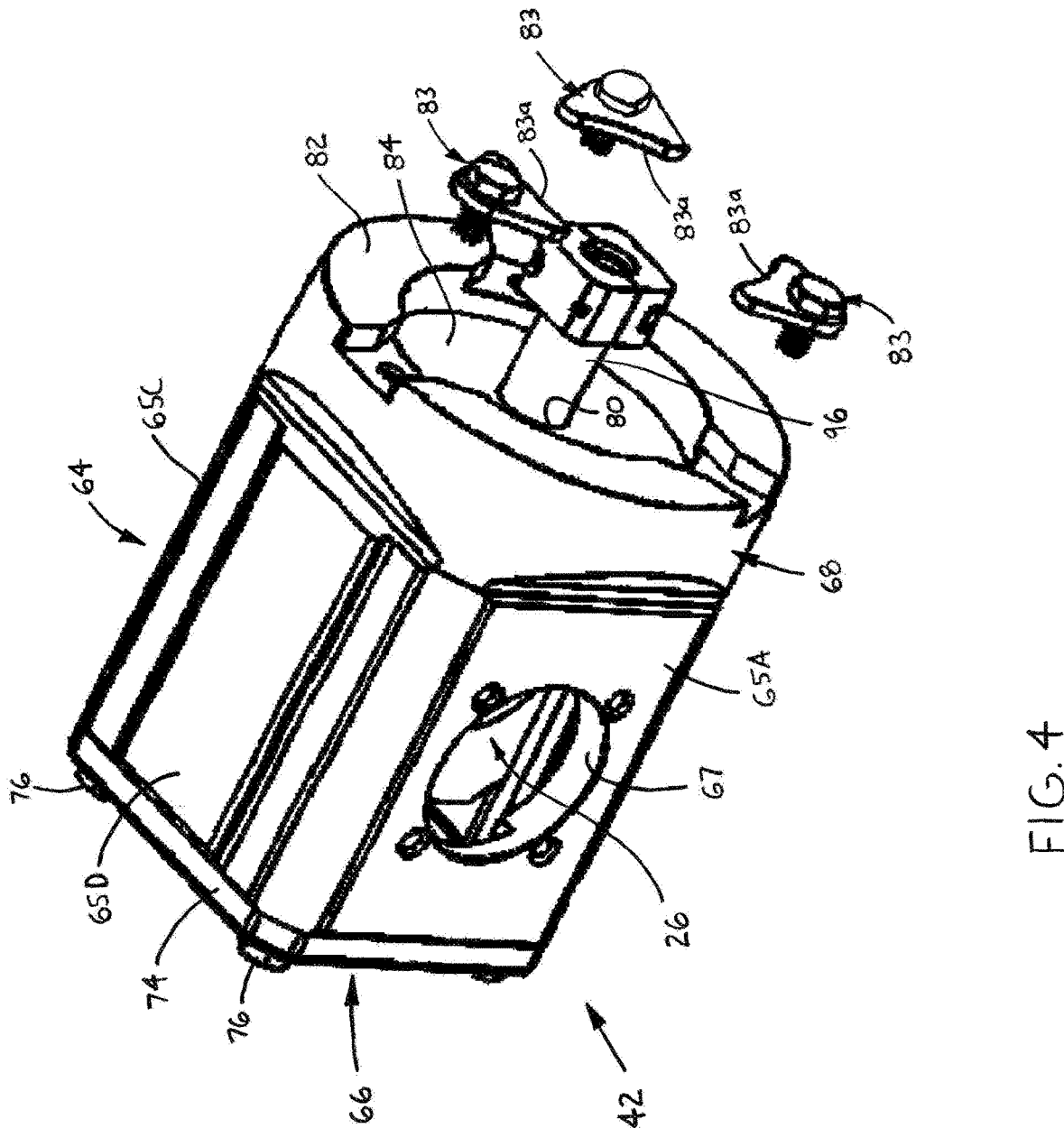
FIG. 4 is a perspective view of a housing upper member, shown without a bearing housing and with retainer tabs spaced from the remainder of the upper member.
Figure 5:
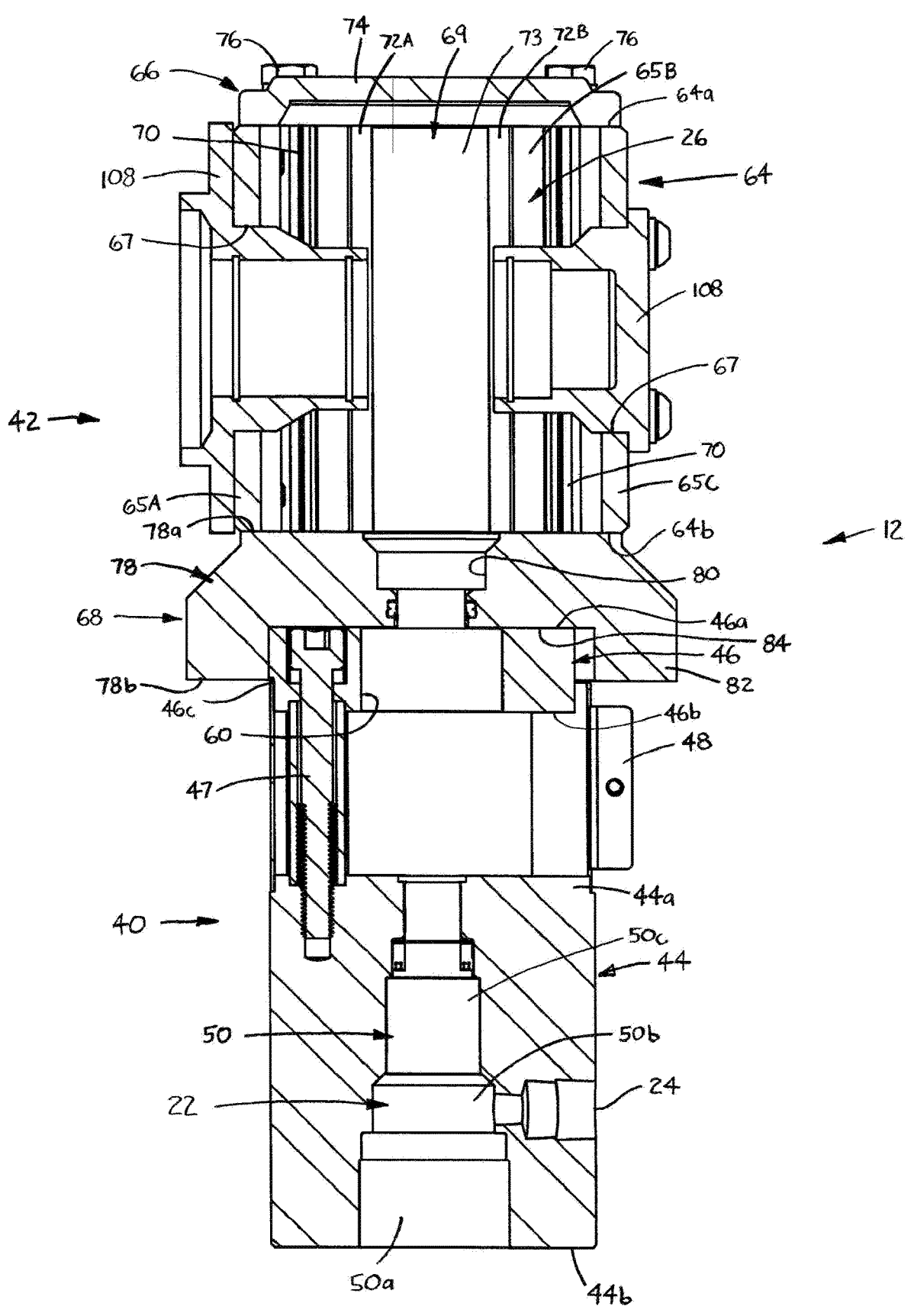
FIG. 5 is cross-sectional view of the housing upper and lower members, shown without the drive mechanism and the pumping tube assembly.

Certain terminology is used in the following description for convenience only and is not limiting. The words "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-21 a portable reciprocating pump assembly 10 for delivering lubricant from a reservoir 1 (FIG. 1; shown in phantom), the reservoir 1 having a body 2 defining an interior storage chamber 3 for containing a quantity of lubricant and a cover 4 attached to an upper end 2a of the body 2. Preferably, the lubricant is a type of grease and the pump assembly 10 delivers the grease to an end use point, such as a bearing, a gear train, a linkage mechanism, etc., but the pump assembly 10 may be used to deliver any type of lubricant to any desired end use point. The pump assembly 10 basically comprises a housing 12 mountable on the reservoir 1, a pumping tube assembly 14 for directing lubricant from the reservoir 1 and into the housing 12, a drive mechanism 16 for operating the pumping tube assembly 14, a motor 18 for actuating the drive mechanism 16, and a battery 20 providing power to the motor 18.

More specifically, the housing 12 is mountable on the reservoir cover 4 and has a lubricant chamber 22 with at least one outlet 24 and a drive chamber 26 spaced from the lubricant chamber 22. The pumping tube assembly 14 has an upper end 14a coupled with the housing 12 and a lower end 14b disposeable within the reservoir storage chamber 3. The pumping tube assembly 14 includes an elongated pump rod or "plunger" 28 configured to linearly displace along a plunger axis 29 so as to displace or pump lubricant located within the storage chamber 3 to the housing lubricant chamber 22 and thereafter through the housing outlet 24. Further, the drive mechanism 16 is disposed at least partially within the housing drive chamber 26 and is configured to drive the plunger 28 to reciprocate along the plunger axis 29, and thereby displace the lubricant as described.

The electric motor 18 is connected with the housing 12 so as to be disposed externally thereof and has a rotatable shaft 19 coupled with the drive mechanism 16. As such, rotation of the motor shaft 19 about a shaft central axis 19a actuates the drive mechanism 16. Furthermore, the battery 20 is electrically connected with the motor 18 and is preferably mounted directly on the motor 18 (as shown) or alternatively on the housing 12. The battery 20 provides electrical energy to the motor 18 such that the pump assembly 10 operates without connection to a power source separate from the pump assembly 10, thus enabling the assembly 10 to be "portable" and readily transportable or transferable between different lubricant reservoirs 1. Preferably, the battery 20 is removably attached to the motor 18 (e.g., by a plug/socket connection) for relatively quick replacement when electric charge has been substantially drained, but may alternatively be integrally formed with the motor 18 such that the battery 20 is recharged "in place".

Figure 21:
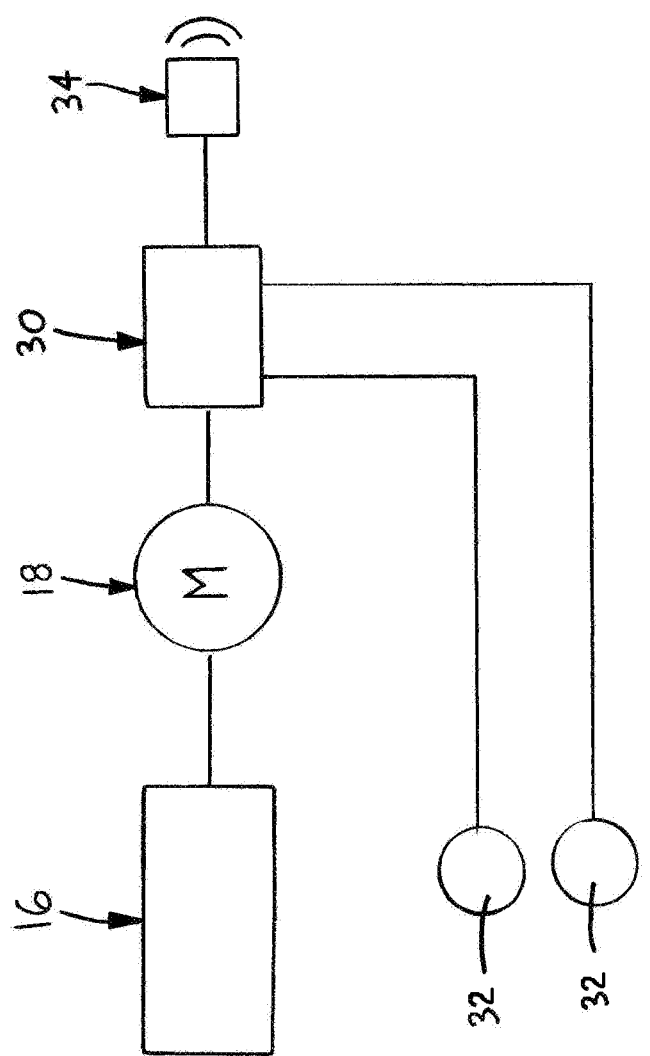
FIG. 21 is a schematic view of the motor and a control system for operating the motor.

Referring particularly to FIG. 21, the pump assembly 10 preferably further comprises a control 30 configured to operate the motor 18, and thereby the entire pumping assembly 10, and one or more sensors 32 configured to sense one or more operating parameters of the pumping assembly 10, such as for example, lubricant flow volume and flow rates through the one or more housing outlets 24, reciprocation rate of the plunger 28, etc. The control 30 is also preferably configured or programmed to record and store data from the sensor(s) 32, the motor 18, etc. Further, the pumping assembly 10 may also comprise a transceiver 34 configured to communicate with the control 30 and to wirelessly communicate with a remote computer 5, so as to thereby transmit data to the remote computer 5 and/or to receive operating instructions or motor programming from the computer 5. Having described the basic components and functioning above, these and other components of the present pumping assembly 10 are discussed in further detail below.

Referring now to FIGS. 2, 3, 5 and 6, the housing 12 preferably includes a housing lower member 40 providing the lubricant chamber 22 and a housing upper member 42 providing the drive chamber 26 and being releasably connected with the housing lower member 40. The housing lower member 40 preferably includes a lower cylindrical body 44, an upper adapter collar 46 spaced axially from the cylindrical body 44, a plurality of threaded fasteners 47 attaching the adapter collar 46 to the cylindrical body 44 and a tubular shield 48 enclosing the space between the body 44 and collar 46 and thereby also enclosing the fasteners 47. The cylindrical body 44 is disposable upon the reservoir cover 4, is preferably generally circular and has upper and lower ends 44a, 44b and a central bore 50 extending between the body upper and lower ends 44a, 44b and along the plunger axis 29.

Figure 6:
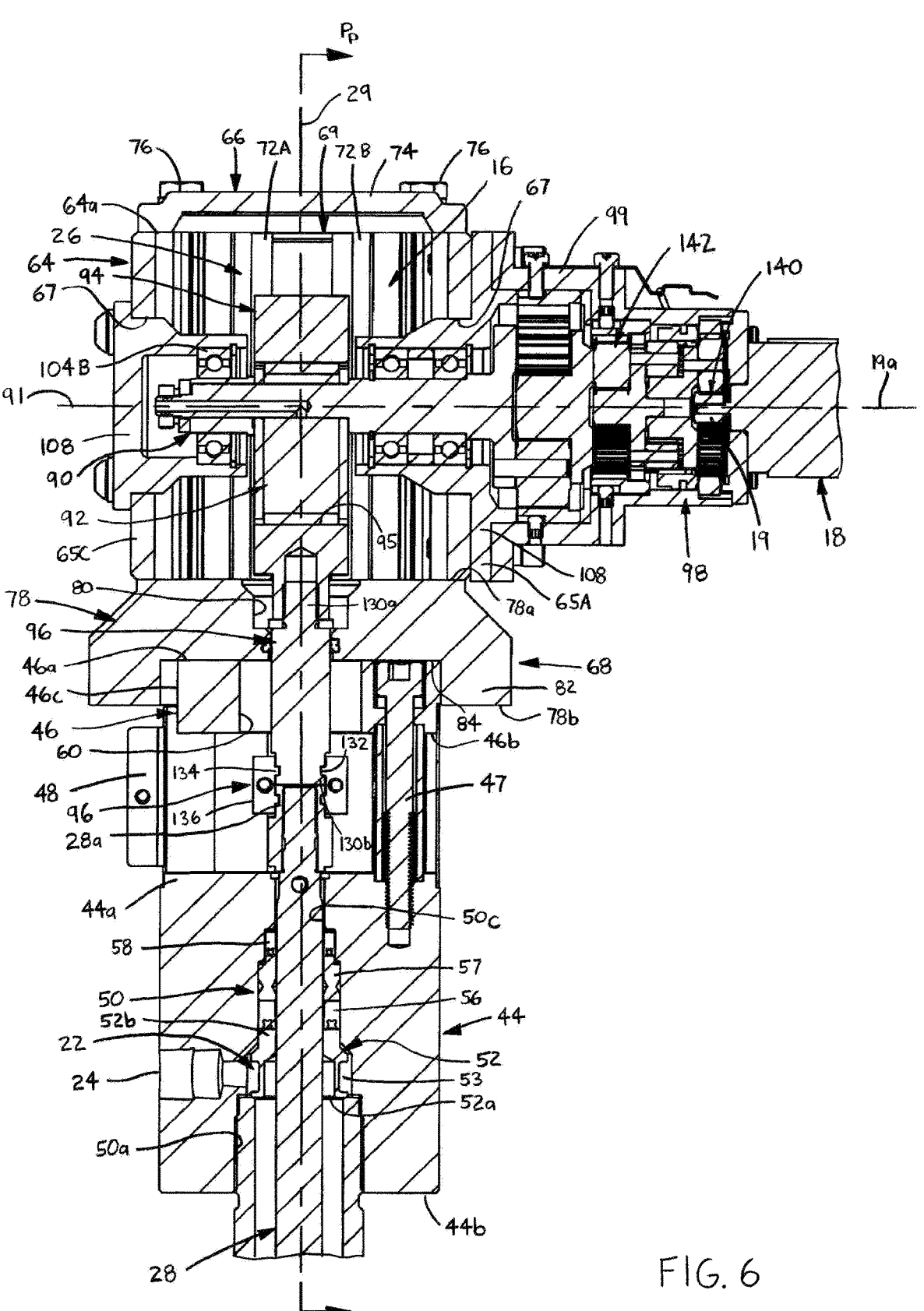
FIG. 6 is a partly broken-away, cross-sectional view of the pump assembly.

The central bore 50 has a lower section 50a receiving the upper end 14a of the pumping tube assembly 14, as described below, a central section 50b providing the lubricant chamber 22, and an upper section 50c through which extends the upper end 28a of the plunger rod 28, also described below. As best shown in FIG. 6, a manifold 52 is preferably disposed within the lubricant chamber 22 and has an open lower end 52a receiving lubricant flow from the pumping tube assembly 14, one or more radial openings 53 to direct flow into the chamber 22, and an upper end 52b with an opening (not indicated) which functions as a bearing supporting the plunger 28. Further, a first seal 56, a guide ring 57 and a second seal 58 are stacked axially within the upper section 50c of the central bore 50, the seals 56, 58 preventing lubricant flow from the lubricant chamber 22 and the guide ring 57 slidably supporting the plunger 28.

Further, the adapter collar 46 of the housing lower member 40 is generally circular cylindrical and has upper and lower ends 46a, 46b, a central opening 60 extending between the upper and lower ends 46a, 46b, and an outer circumferential surface 46c. A plurality of arcuate coupling tabs 62 extend radially outwardly from the outer surface 46c and are releasably engageable with the housing upper member 42, as described below. Furthermore, the tubular shield 48 is removably disposed about the upper end 44a of the lower cylindrical body 44 and about the lower end 46b of the adapter collar 46 and may be removed from the housing lower member 40 to enable access to a coupler 96 connecting the plunger 28 with the drive mechanism 16, as discussed in detail below.

Referring to FIGS. 2 and 4-6, the upper member 42 of the housing 12 preferably includes a main tubular body 64, a cover 66 and an adapter block 68. The tubular body 64 is preferably rectangular having four walls 65A, 65A, 65C and 65D, opposing upper and lower open axial ends 64a, 64b and a hollow interior providing the drive chamber 26. At least one opening 67 extends through the wall 65A for receiving a portion of the drive mechanism 16 and preferably the body 64 has two aligned openings 67 extending through facing walls 65A and 65C. Preferably, first and second tubular bearing housings 108 each extend through a separate one of the housing openings 67 and contain bearings 104A, 104B, 104C, as described below. The tubular body 64 preferably further includes four elongated lugs 70, each lug 70 being located in separate inner corner of the body 64, extending between the ends 64a, 64b and having a through hole (not depicted). Further, two rectangular slide plates 69 are attached to walls 65B, 65D and provide first and second pairs of guide rails 72A, 72B and a bearing surface 73 extending parallel with the plunger axis 29. Each pair of rails 72A, 72B is configured to slidably receive a vertical side 122A, 122B, respectively, of a follower 94 of the preferred drive mechanism 16 as described below. Preferably, the tubular body 64 is formed as an extrusion of lightweight metallic material (e.g., aluminum), but may be formed of a molded polymer or in any other appropriate manner.

The cover 66 includes a generally rectangular plate 74 sized to enclose the upper axial end 64a of the tubular body 64. The cover 74 is preferably connected to both the main tubular body 64 and the adapter block 68 by a plurality of threaded fasteners 76. Each fastener 76 extends from the cover 66, through the holes in the body lugs 70, and into threaded openings (not depicted) in the adapter block 68 so as to thereby attach the adapter block 68 to the lower axial end 64b of the tubular body 64.

Further, the adapter block 68 has a generally rectangular body 78 with opposing upper and lower axial ends 78a, 78b and a central opening 80 extending between the ends 78A, 78b, which provides clearance for the coupler 96 of the drive mechanism 16 as described below. A circular shoulder 82 projects axially from the lower axial end 78b and is spaced radially outwardly from the central opening 80 such that an annular contact surface 84 is defined between the opening 80 and the shoulder 82. A plurality of retainer tabs 83 are attached to the shoulder 82 and are spaced about the central opening 80, each tab 83 having a portion 83a projecting radially inwardly from the shoulder 82. With this structure, the upper end 46a of the adapter collar 46 of the housing lower member 40 is disposeable against the contact surface 84 of the adapter block 68, then relative rotation between the collar 46 and the block 68 causes each retainer tab 83 to engage with a separate one of the arcuate coupling tabs 62 to releasably connect the lower and upper housing members 40, 42.

Although the housing 12 is preferably formed as described herein and depicted in FIGS. 2-6, the housing 12 may be formed in any other appropriate manner that is capable of housing the drive mechanism 16 and supporting the pumping tube assembly 14 and the motor 18. For example, the housing 12 may be formed as a single body containing both the lubricant chamber 22 and the drive chamber 26 as opposed to lower and upper housing members 40, 42 and/or formed of any other appropriate combinations of components. The scope of the present invention encompasses all appropriate constructions of the housing 12 and is in no manner limited to the structures depicted and described herein.

Referring now to FIGS. 6-10, in a presently preferred construction, the drive mechanism 16 basically includes a drive shaft 90 connected with the motor shaft 19, a cam 92 mounted on the drive shaft 90 and a follower 94 engaged by the cam 92 and coupled with the plunger 28. The drive mechanism 16 is configured to convert the rotational motion of the motor shaft 19 to axially reciprocal movement of the plunger 28. Preferably, the drive mechanism 16 also includes the coupler 96, which connects the follower 94 with the plunger 28, and a gear train 98 operatively coupling the motor shaft 19 with the drive shaft 90. As discussed below, the gear train 98 functions to both rotate the drive shaft 90 at a reduced speed in comparison with the motor shaft speed and to vary the rotational speed of the drive shaft 90, and thereby the rate of reciprocation of the plunger 28.

More specifically, the drive shaft 90 is disposed within the housing drive chamber 26 and extends through one housing opening 67, the shaft 90 being rotatable about a drive axis 91 extending longitudinally through the drive shaft 90. Preferably, the drive axis 91 extends perpendicular to a vertical plane $P_p$ (indicated in FIG. 6) containing the plunger axis 29. The drive shaft 90 includes an elongated cylindrical rod 100 with opposing first and second axial ends 100a, 100*b* and an integral flange portion 102 at the first axial end 100*a* connected with an output gear of the gear train 96, as described below. The drive shaft 90 is preferably rotatably supported by first and second rolling bearings 104A, 104B spaced apart along the drive axis 91, and most preferably also by a third bearing 104C adjacent to the first bearing 104A, such that the cam 92 and follower 94 are disposed between the bearings 104A, 104B. Each bearing 104A, 104B is disposed within a separate tubular bearing housing 108 extending axially through one of the openings 67 of the main tubular body 64 of the housing upper member 42. Further, each bearing 104A, 104B, 104C has a rotatable inner ring 106 disposed on the drive shaft 90 and a fixed outer ring 107 coupled with the housing 12 through the bearing housings 108, as well as a plurality of rolling elements (not indicated) disposed between the rings 106, 107.

Figure 7:
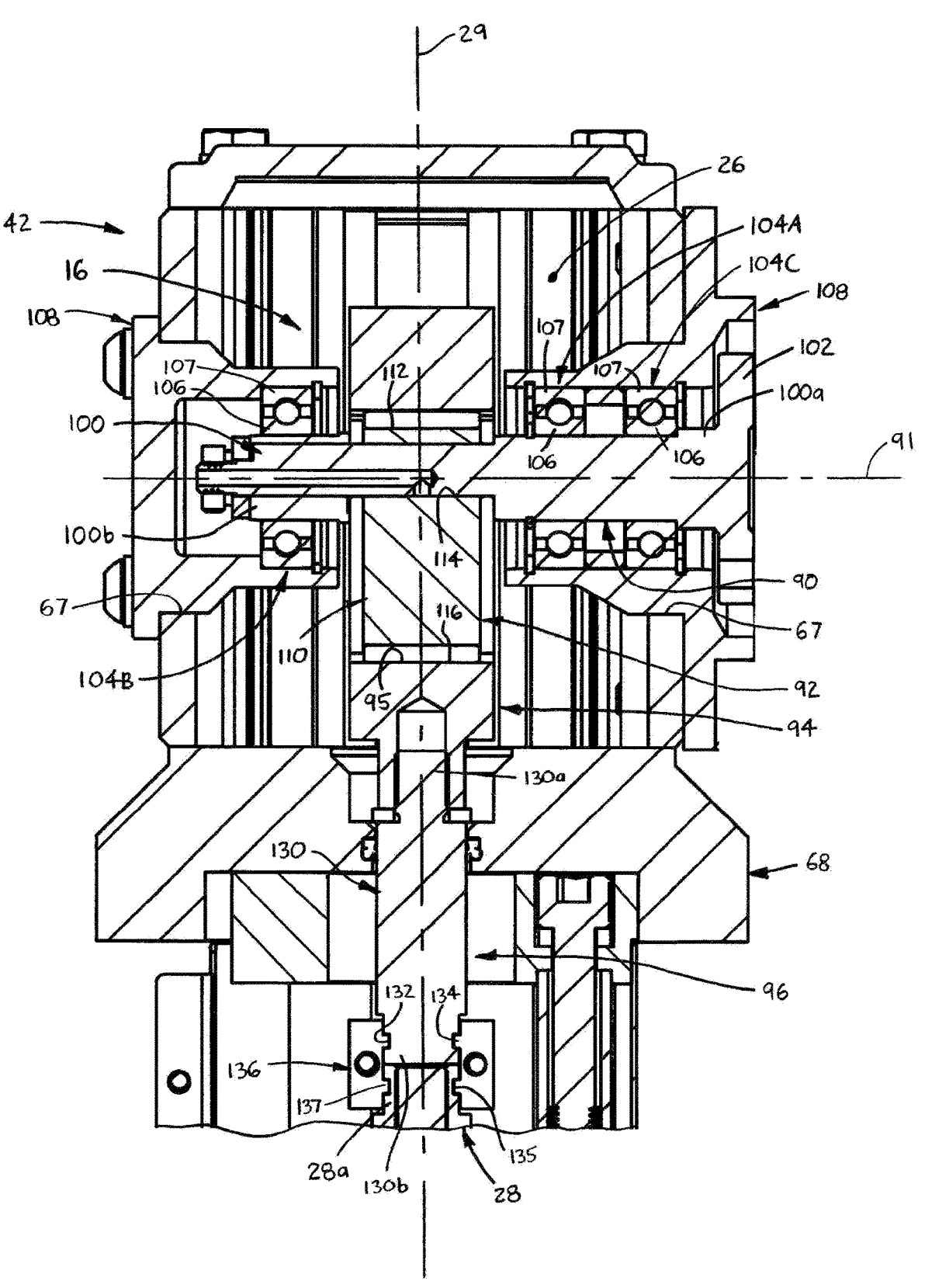
FIG. 7 is an enlarged view of an upper portion of FIG. 6, shown without a gear train, a motor and a battery.
Figure 8:
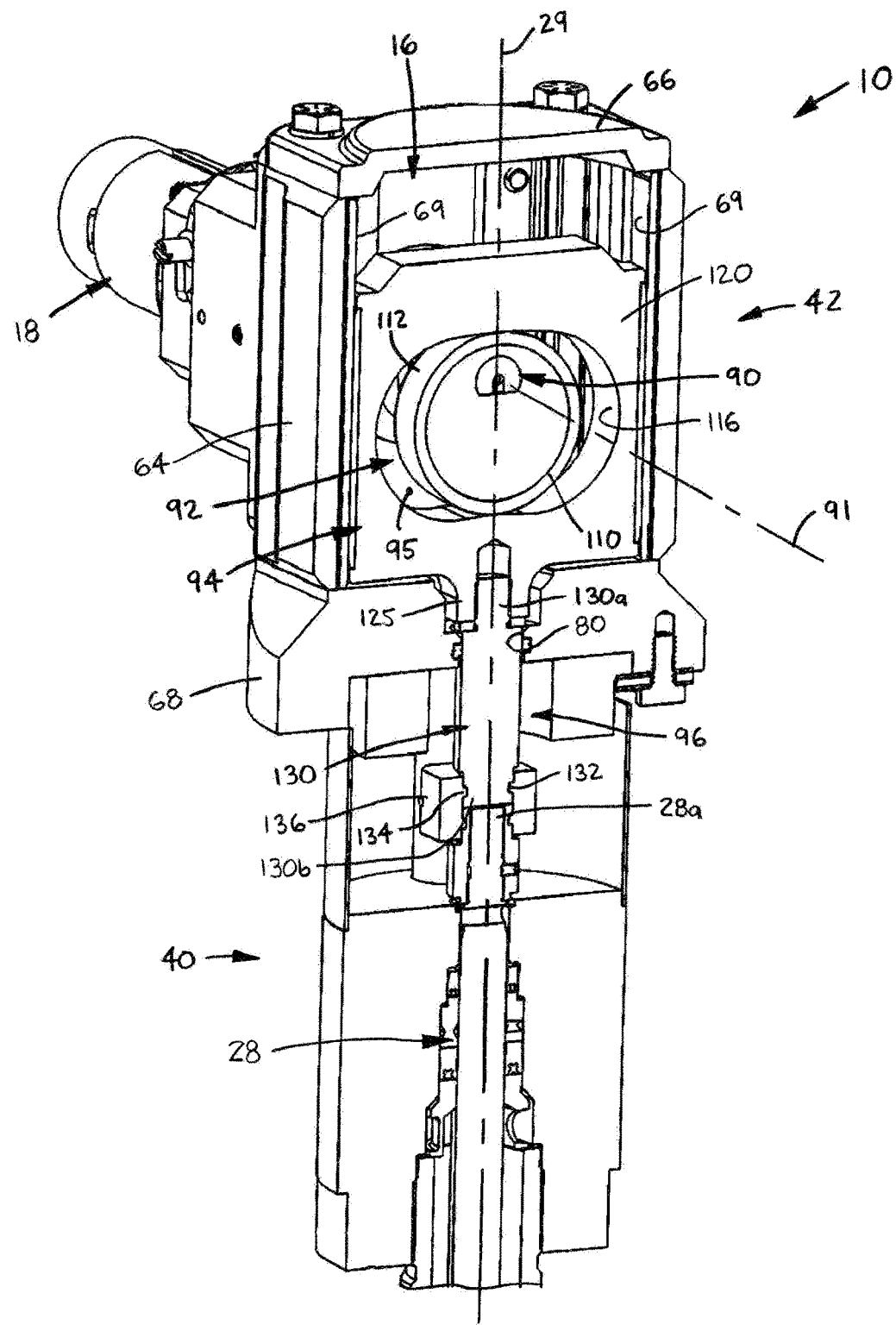
FIG. 8 is a broken-away, partially perspective cross-sectional view of the pump assembly taken through a plane perpendicular to the drive shaft axis and containing the plunger axis.
Figures 9, 10:
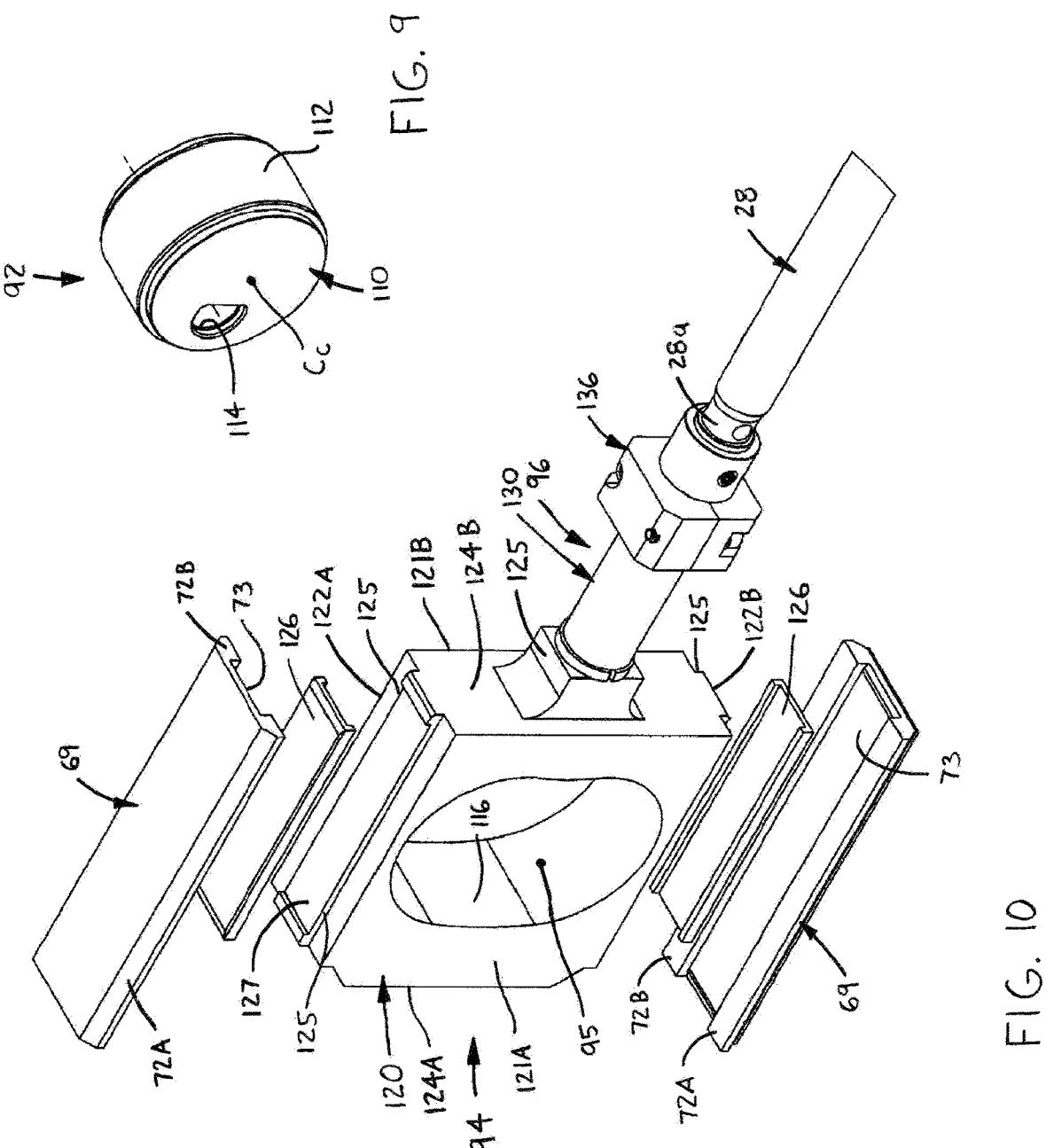
FIG. 9 is a perspective view of a cam of the drive mechanism.
FIG. 10 is an exploded, perspective view of a follower of the drive mechanism, shown with housing guide rails.
Figure 11:
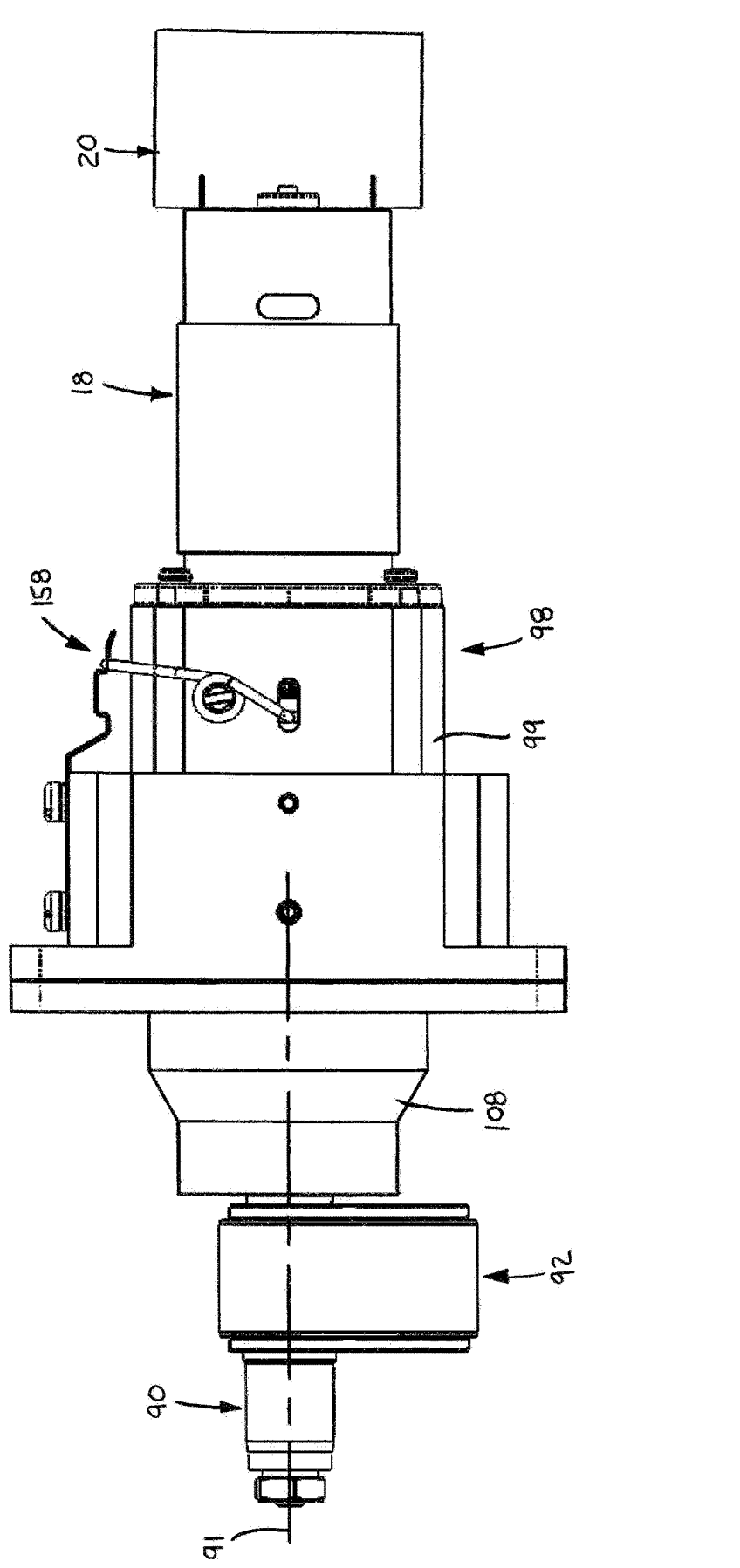
FIG. 11 is a side plan view of the drive shaft, the gear train, the motor and the battery.

Referring now to FIGS. 7-9, the cam 92 preferably includes a generally circular cylindrical body 110 having an outer circumferential camming surface 112 extending eccentrically about the drive axis 91. Specifically, the cam 92 has an offset through hole 114 extending through the cylindrical body 110 at a position offset from the center $C_C$ (FIG. 10) of the cam body 110. The drive shaft 90 extends through the offset hole 114 such that the circular camming surface 112 is eccentric with respect to the drive axis 91.

Referring to FIGS. 7, 8 and 10, the follower 94 has an opening 95 defined by an enclosed inner surface 116, the cam 92 being disposed within the follower opening 95. As such, the eccentric camming surface 112 slides along the follower inner surface 116 such that the cam 92 pushes the follower 94 to reciprocate along the plunger axis 29 between a lower position, shown in FIGS. 6-8, and an upper position (not depicted) when the drive shaft 90 rotates the cam 92 about the drive axis 91. Preferably, the follower 94 includes a generally rectangular block 120 with two opposing planar faces 121A, 121B, first and second vertical sides 122A, 122B, upper and lower horizontal sides 124A, 124B and an integral lug 125 projecting from the lower horizontal side 124B.

With the preferred block 120, the follower opening 95 extends between the two planar faces 121A, 121B and is preferably generally elliptical, but may be formed in any other appropriate shape. Each vertical side 124A, 124B of the block 120 preferably has two inwardly-spaced slide surfaces 125 and a low friction pad 126 on an end surface 127. The slide surfaces 125 of each side 124A, 124B are disposed between the guide rail pairs 72A, 72B of a separate one of the housing slide plates 69 and the low friction pad 126 is slidable against the inner bearing surface 73 of the particular plate 69. Thereby, the follower 94 is slidably supported during reciprocal displacement along the plunger axis 29 in manner which minimizes friction between the follower 94 and the housing tubular body 64.

Still referring to FIGS. 6-8 and 10, the coupler 96 includes an elongated cylindrical body 130 with a first, upper end 130*a* attached to the lug 125 of the follower block 120 and a second, lower end 130*b* releasably connected with the plunger 28. The coupler body 130 extends through the central opening 80 of the adapter block 68 of the housing upper member 42 and into the housing lower member 44. Further, the coupler body 130 preferably has an annular groove 132 located adjacent to the lower end 130*b* for receiving an upper annular shoulder 134 of a clamping block 136 connecting the coupler 96 with the plunger 28, as discussed below.

Although the drive mechanism 16 is preferably constructed as described in detail above and depicted herein, the drive mechanism 16 may alternatively be formed in any other appropriate manner which functions to transform rotation of the motor shaft 19 to reciprocal motion of the plunger 28. For example, the drive mechanism 16 may include another type of crank-slider mechanism, a rack gear arrangement, etc. The scope of the present invention encompasses all appropriate configurations of the drive mechanism 16 and is in no manner limited to the structures depicted and described herein.

Figure 12:
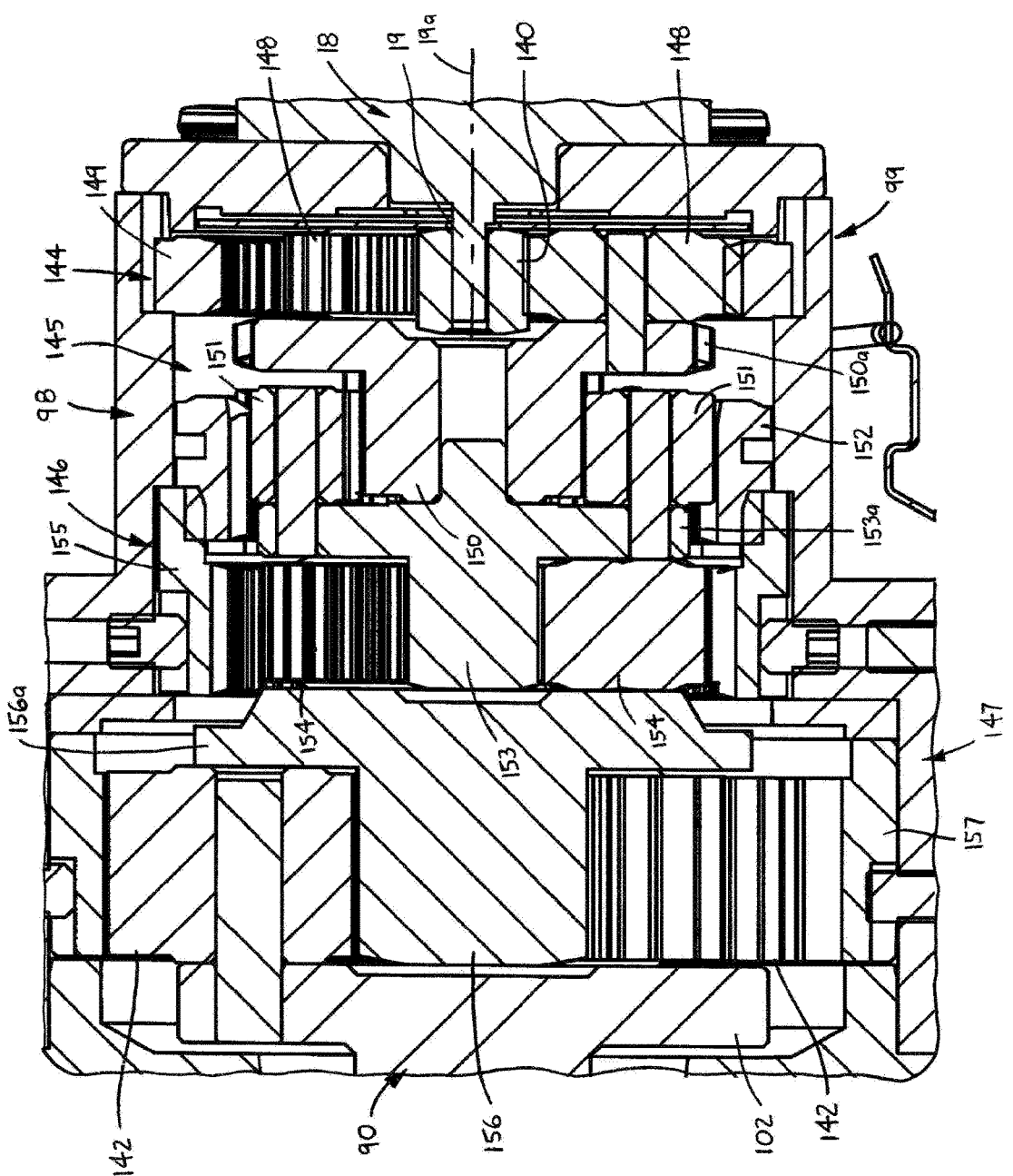
FIG. 12 is an axial cross-sectional view of the gear train.

Referring to FIGS. 6 and 11-13, the gear train 98 is disposed between the motor 18 and the housing tubular body 64 and includes an input gear 140 connected with the motor shaft 19 and an output gear 142, preferably a plurality of output gears 142, connected with the drive shaft 90 of the drive mechanism 16. In a presently preferred embodiment, the gear train 98 includes four planetary gear sets 144, 145, 146 and 147 disposed within a housing 99, which may be operable as four individual gear sets or as three sets, as discussed below. As best shown in FIG. 12, the first gear set 144 includes the input gear 140, preferably formed as a sun gear mounted on the motor shaft 19, a plurality of planet gears 148 engaged with the input gear 140 and a fixed outer ring gear 149. The planetary gears 148 are connected to the flange 150*a* of a rotatable sun gear 150 of the second planetary gear set 145, which further includes a plurality of planet gears 151 engaged with the sun gear 150 and with a non-rotatable, axially slidable outer ring gear 152. Further, the planetary gears 151 of the second gear set 145 are connected with the flange 153*a* of a rotatable sun gear 153 of the third gear set 146. The third gear set 146 also includes a plurality of planet gears 154 engaged with the sun gear 153 and with a fixed outer ring 155, the planet gears 154 being coupled with the flange 156*a* of a sun gear 156 of the fourth gear set 147. The fourth gear set 147 also includes the plurality of output planet gears 142 attached to the flange portion 102 of the drive shaft 90 and a fixed outer ring gear 157.

Figure 13B:
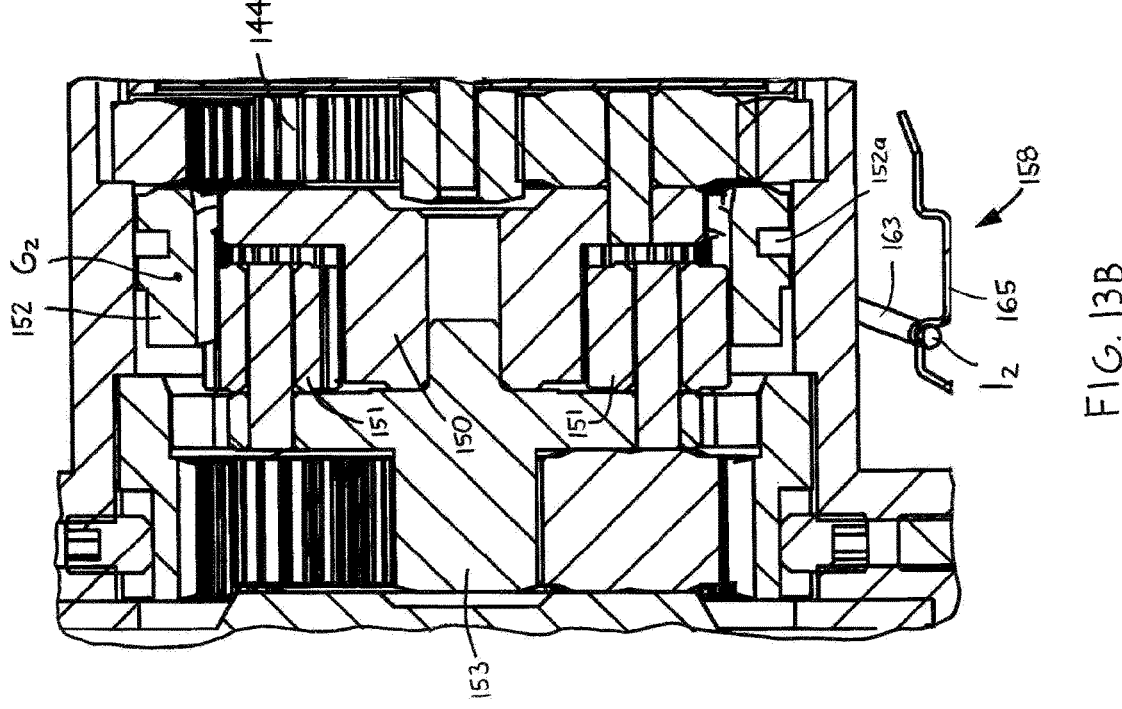
FIGS. 13A and 13B, collective
Figure 13A:
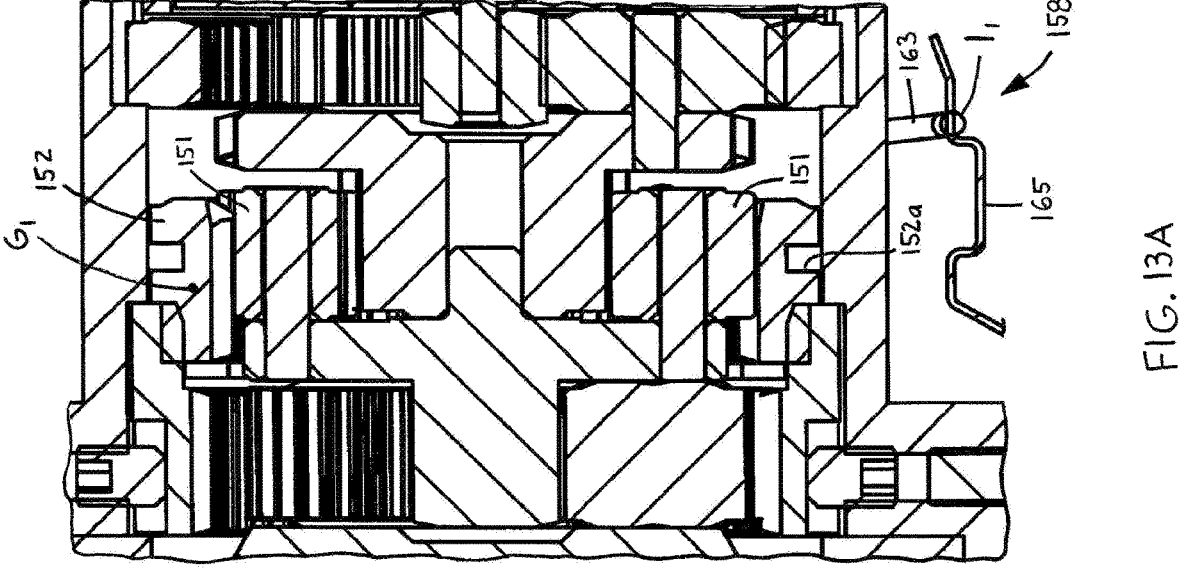

Preferably, the gear train 98 includes a selector 158 manually manipulable to adjust a gear ratio of the gear train 98 between at least two values so as to vary a rate of reciprocation of the plunger 28. As best shown in FIG. 13, the ring gear 152 of the second gear set 145 is axially displaceable between a first position $G_1$, shown in FIGS. 13A, in which the ring gear 152 is only engaged with the planet gears 151 of the second gear set 145, and a second position $G_2$, in which the ring gear 152 is engaged with both the planet gears 151 and the sun gear 150 of the second gear set 145. In the first position $G_1$, the second gear set 145 is functional to contribute to the reduction in the rotation speed of the drive shaft 90, such that the gear ratio is at a higher value and the plunger 28 reciprocates at a first, lower rate. In the second position $G_2$, the planet gears 148 of the first gear set 144 drive the sun gear 153 of the third gear set 146, through the sun gear 150 and the planet gears 151, such that the second gear set 145 provides no speed reduction of the drive shaft 90, the gear ratio is at a lower value and the plunger 28 reciprocates at a second, higher rate. Further, the selector 158 preferably includes a manually pivotable lever 163 engageable with an annular groove 152*a* of the ring gear 152, such that movement of the lever 163 displaces the ring gear 152 between the first and second positions $G_1$, $G_2$, and a retainer 165 for releasably locking the lever 163 at two selector positions $l_1$, $l_2$, and thereby retaining the gear 152 at the two positions $G_1$, $G_2$, respectively.

Although the gear train 98 is preferably constructed as described above and depicted in FIGS. 6 and 11-13, the gear train 98 may be formed in any other appropriate manner, such as a series or combination of spur gears, helical gears, worm gears, etc. and/or may be non-adjustable so as to have only a single gear ratio or adjustable between three or more gear ratios. The scope of the present invention encompasses all possible gear train types and is in no manner limited to the structure depicted and described herein.

Figure 14:
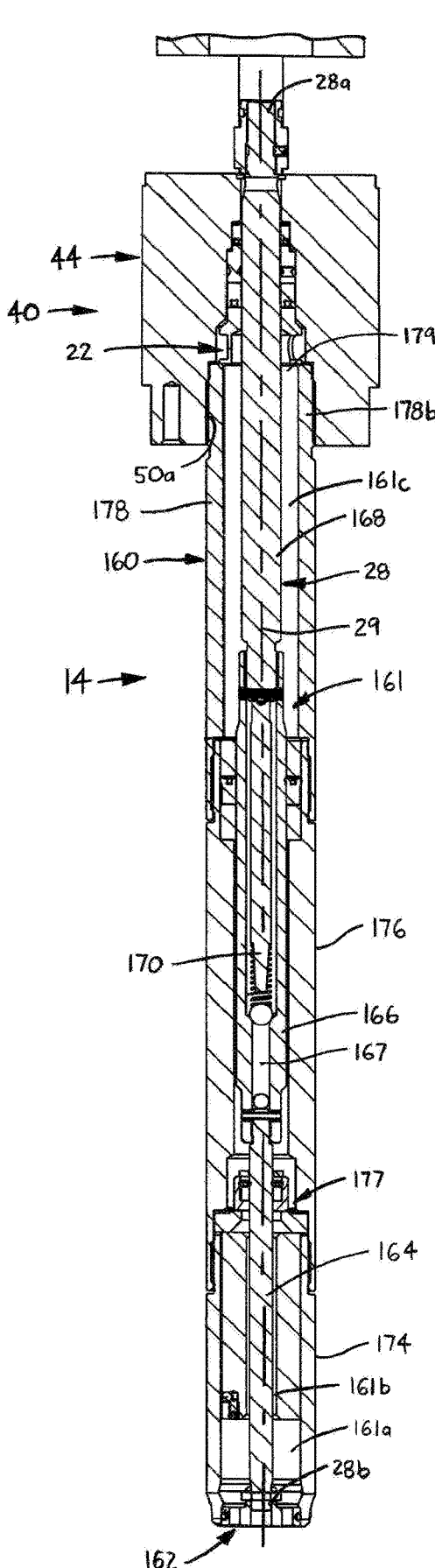
FIG. 14 is a cross-sectional view of the housing lower member and the pumping tube assembly.
Figure 15:
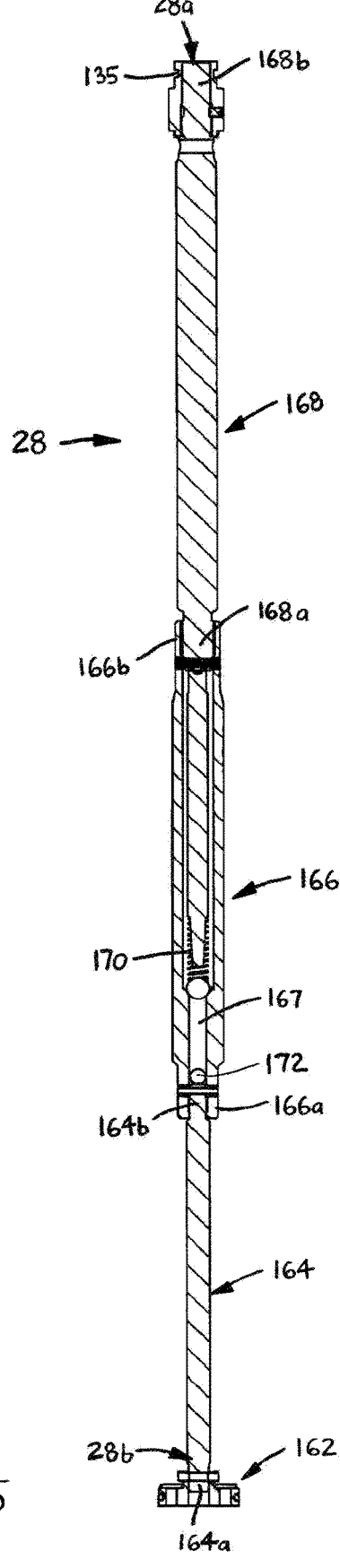
FIG. 15 is a cross-sectional view of a plunger of the pumping tube assembly.
Figure 16:
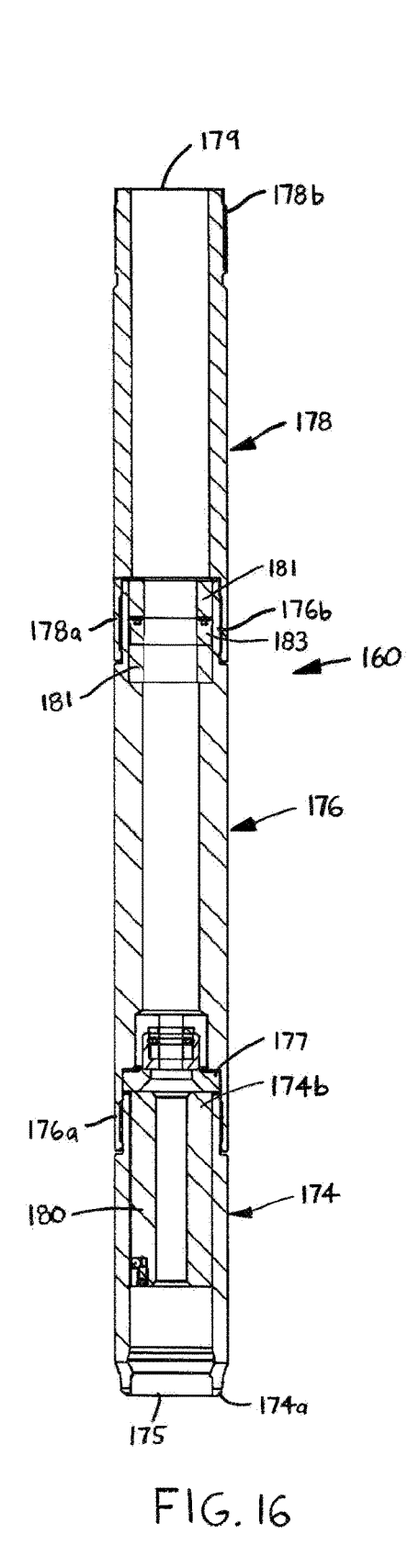
FIG. 16 is a cross-sectional view of a tubular body of the pumping tube assembly.
Figure 17:
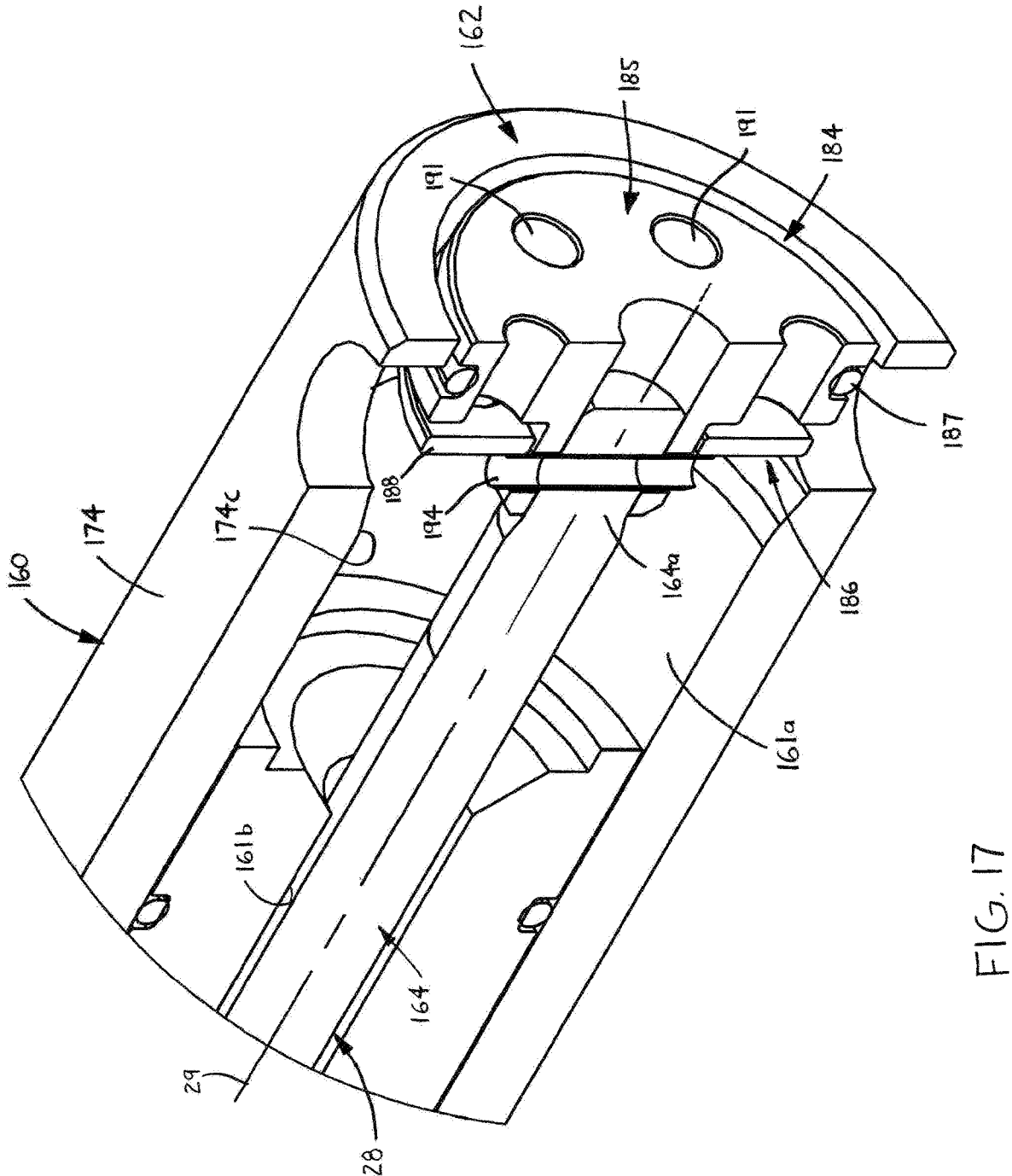
FIG. 17 is a broken-away, enlarged view of a lower end of the pumping tube assembly, showing a preferred shovel assembly.
Figure 18:
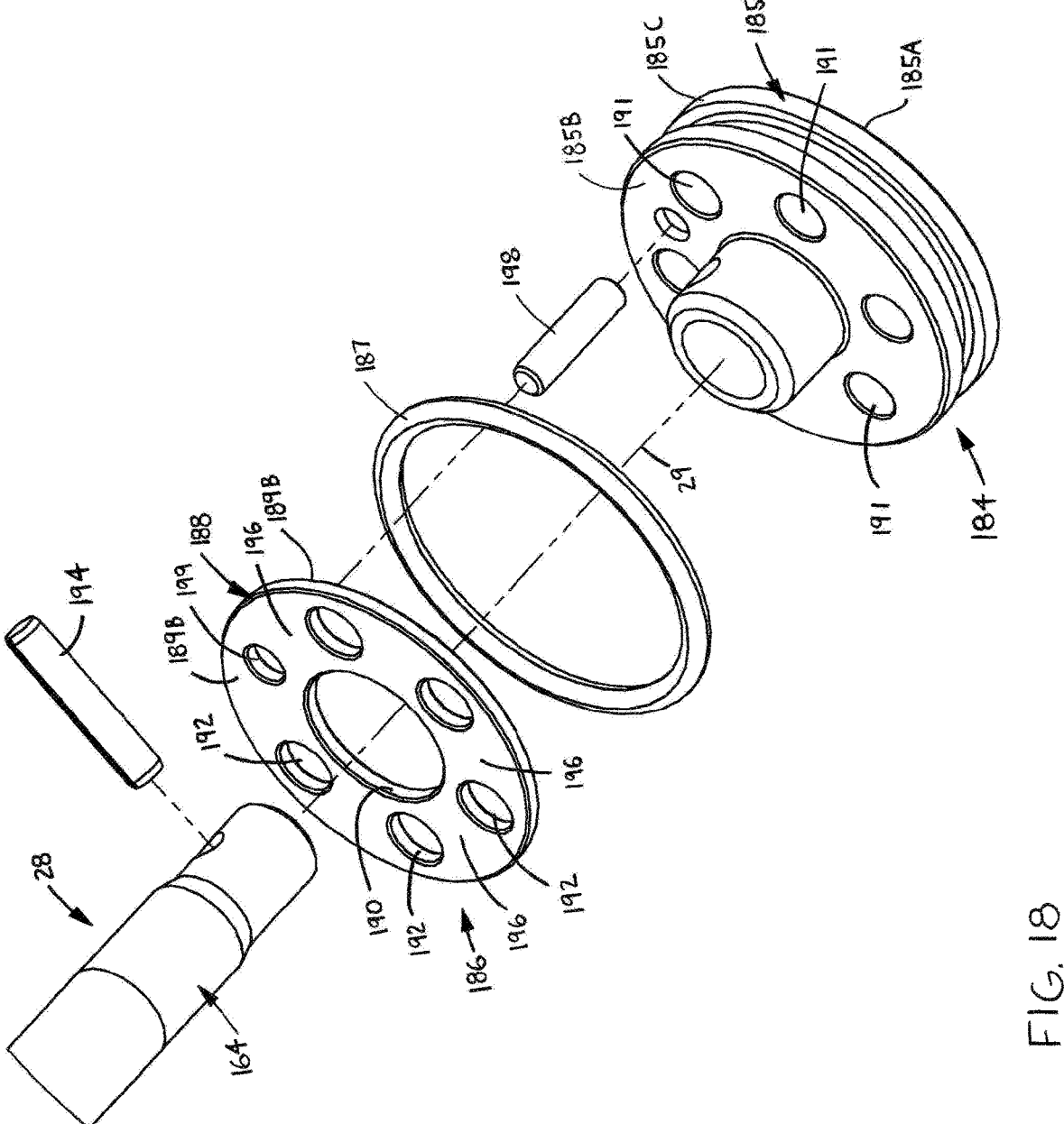
FIG. 18 is an exploded view of the shovel assembly and a lower end of a plunger.

Referring now to FIGS. 14-16, the pumping tube assembly 14 basically includes the plunger 28, as described above and in further detail below, an elongated tubular body 160 housing the plunger 28, and a shovel assembly 162 attached to the plunger 28 configured to displace lubricant into the tubular body 160. More specifically, the plunger 28 has an upper end 28a connected with the drive mechanism 16 and a lower end 28b disposed within the reservoir chamber 3. Preferably, the plunger 28 is an assembly of three rod sections 164, 166 and 168 connected together end-to-end and spaced apart along the plunger axis 29. The lower rod section 164 is a solid elongated cylinder and has a lower end 164a, to which is attached the shovel assembly 162, and an opposing upper end 164b attached to a lower end 166a of the central rod section 166.

The central rod section 166 is generally tubular and has a central bore 167 extending from the lower end 166a to an upper end 166b. A check valve assembly 170 is disposed within the central bore 167 and allows one directional lubricant flow from an inlet port 172 adjacent to the rod lower end 166a to an outlet port (not shown) adjacent to the rod upper end 166b. Further, the upper rod section 168 is a solid elongated cylinder and has a lower end 168a attached to the upper end 166b of the central rod section 166 and an upper end 168a connected with the drive mechanism 16, specifically the coupler 96. As mentioned above, an annular groove 135 is formed adjacent to the upper end 168b and receives a lower shoulder 137 of the clamping block 136 to releasably connect the plunger 28 with the coupler 96.

Referring to FIGS. 14 and 16, the tubular body 160 is fixedly connected with the housing 12, specifically the housing lower member 40, and is disposed about the plunger 28 so as to define a flow passage 161 (FIG. 14) between the plunger 28 and the tubular body 160. Preferably, the tubular body 160 includes three tubular sections 174, 176, 178 connected together end-to-end, spaced apart along the plunger axis 29 and enclosing the rod sections 164, 166 and 168 of the plunger 28. Specifically, the lower tubular section 174 has a lower end 174a with an inlet opening 175 and an upper end 174b attached to a lower end 176a of the central tubular section 176. An annular sleeve 180 is disposed within the lower tubular section 174 and about the lower rod section 164, is spaced axially from the inlet opening 175 and defines a narrow annular section 161b of the flow passage 160, as discussed below. The central tubular section 176 has a valve assembly 177 disposed adjacent to the section lower end 176a and controlling flow out of the sleeve 180, and two bearings or bushings 181, separated by a seal 183, are disposed within the central section 176 adjacent to an upper end 176b and slidably support the central section 166 of the plunger 28. Furthermore, the upper tubular section 178 has a lower end attached to the upper end 176b of the central section 176 and an upper end 178b disposed within the bore lower section 50a of the housing cylindrical body 44 and having an outlet 179, as discussed above.

Referring to FIGS. 17-20, the shovel assembly 162 includes a circular shovel disk 184 fixedly attached to the lower end 164a of the plunger lower section 164 and an annular valve 186 slidably disposed about the plunger lower section 164. The shovel disk 184 preferably includes a cylindrical body 185 having opposing axial end surfaces 185A, 185B and at an outer circumferential surface 185C. At least one and preferably a plurality of axial openings 191 extend between the surfaces 185A, 185B and are spaced circumferentially about the plunger axis 29, the openings 191 permitting lubricant flow from the reservoir chamber 3. An annular seal 187, preferably an O-ring, is disposed in an annular groove extending about the outer circumferential surface 185 of the disk 184 and is sealingly engageable with an inner circumferential surface 174c of the tubular body lower section 174. The seal 187 is slidable against the inner surface 174c and functions to prevent lubricant flow between the outer surface 185C of the disk 184 and the inner surface 174c of the tubular body 160, such that lubricant primarily enters the pumping tube assembly 14 through the openings 191.

Further, the valve 186 includes an annular plate 188 with opposing axial end surfaces 189A, 189B and a central opening 190 and at least one and preferably a plurality of axial openings 192 extending between the end surfaces 189A, 189B. A portion of the plunger lower section 164 extends through the plate central opening 190 such that the valve 186 is slidably displaceable along the plunger axis 29. Specifically, a retainer pin 194 is attached to the plunger lower section 164 and is spaced axially from the shovel disk 184 such that the valve 186 is located between the disk 184 and the retainer pin 194, the pin 194 limiting the amount of axial displacement of the valve 186 along the plunger 28.

Also, the plurality of axial openings 192 are spaced circumferentially about the plunger axis 29 such that a plurality of closure sections 196 are each defined between a separate one of a plurality of pairs of adjacent openings 192. A guide pin 198 is attached to the disk 184 and is slidably disposed within a guide opening 199 of the valve 186. The guide pin 198 maintains each one of the plurality of valve openings 192 circumferentially offset or staggered from each one of the plurality of openings 191 of the disk 184, so that each valve closure section 196 extends across a separate one of the disk openings 191 when the valve 186 is disposed against the disk 184.

Figure 19:
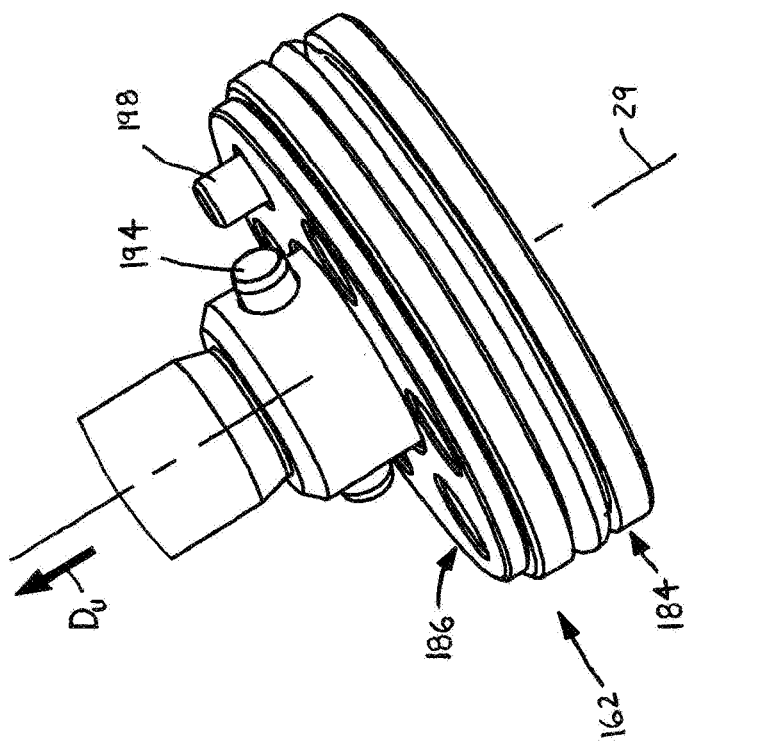
FIG. 19 is a perspective view of shovel assembly in an open configuration.
Figure 20:
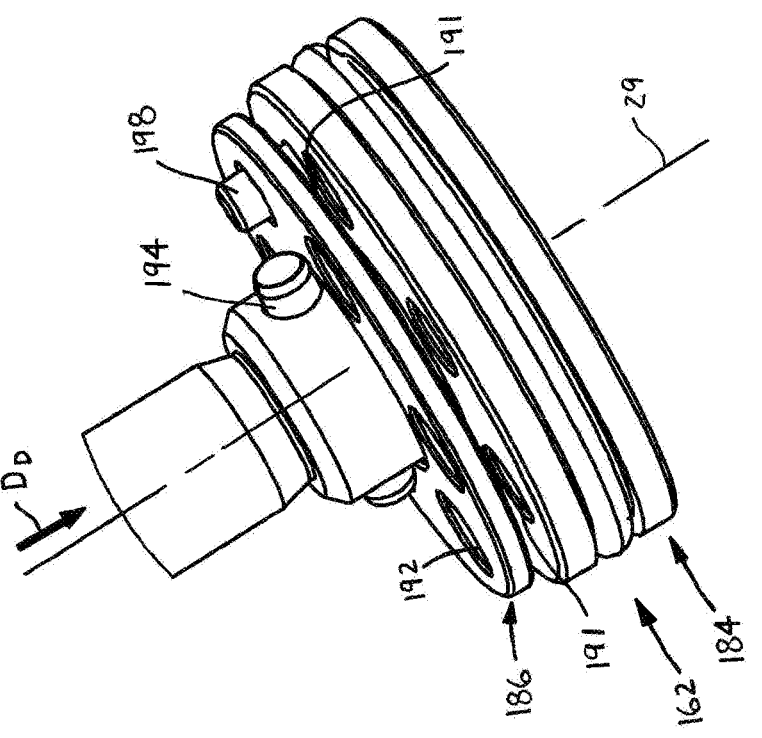
FIG. 20 is a perspective view of shovel assembly in a closed configuration.

Referring to FIGS. 14, 17, 19 and 20, with the shovel assembly structure described above, the valve 186 is disposeable against the disk 184 to prevent lubricant flow through the disk opening(s) 191 when the plunger 28 displaces in a first, upward direction D$_U$ along the plunger axis 28, as indicated in FIG. 19. Thereby, the shovel assembly 162 pushes lubricant disposed within a lowermost "entry" section 161a of the passage 161 into the annular passage section 161b through the sleeve 180 while simultaneously drawing lubricant from the reservoir chamber 3 through the inlet opening 175 and into the entry section 161a. Such movement of the lubricant sequentially pushes lubricant originally within the passage section 161b through the valve 177, into the central tubular section 180, through the inlet port 172 of the rod central section 166 and into the central bore 167, through the check valve assembly 170 and the remainder of the central bore 167, into and through an upper passage section 161c defined between the upper tubular section 178 and the upper rod section 168 and out of a passage outlet 179. The lubricant is then pushed through the manifold 52 and into the lubricant chamber 22 in the lower housing member 40 to thereafter exit the chamber 22 through the one or more outlets 24 for delivery where lubrication is needed.

Such sequential movement of lubricant occurs from the pumping tube inlet opening 175 to the lubricant chamber outlet 24 over multiple reciprocal displacements of the plunger 28. Further, the valve 186 is alternatively spaceable from the shovel disk 184 so as to permit lubricant flow through the one or more disk openings 191, and the one or more valve openings 192, when the plunger 28 displaces in a second, downward direction $D_D$ (FIG. 20) along the plunger axis 29. Thereby, the shovel assembly 162 is able to displace through the portion of lubricant disposed within the passage entry section 161a and thereafter the valve 186 again seats against shovel disk 184 to close the disk openings 191 as the plunger 28 again displaces in the upward direction $D_U$.

Although the pumping tube assembly 14 is preferably constructed as described above and depicted in FIGS. 14-20, the pumping tube assembly 14 may be formed in any other appropriate manner. For example, the plunger 28 may be formed as a single, solid rod, the tubular body 160 may be formed as a single tubular body, and/or the shovel assembly 162 may be formed as a single solid disk, etc. Further, the pumping tube assembly 14 may include any other appropriate combination of valves and/or passage sections to direct lubricant through the pumping tube assembly 14 in any desired manner. The scope of the present invention encompasses all appropriate configurations of the pumping tube assembly 14 and is in no manner limited to the structures depicted and described herein.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A reciprocating pump assembly for delivering lubricant from a reservoir, the reservoir having a body defining an interior storage chamber for containing a quantity of lubricant and a cover attached to an upper end of the body, the pump assembly comprising:

a housing mountable on the reservoir cover and having a lubricant chamber with an outlet and a drive chamber spaced from the lubricant chamber;

a pumping tube assembly having an upper end coupled with the housing and a lower end disposable within the reservoir storage chamber, the pumping tube assembly including an elongated plunger configured to linearly displace along a plunger axis so as to displace lubricant within the storage chamber to the housing lubricant chamber and through the housing outlet;

an electric motor connected with the housing and having a rotatable motor shaft; and a drive mechanism disposed at least partially within the housing drive chamber and including a drive shaft coupled with the motor shaft so as to be rotatable about a drive axis extending longitudinally through the drive shaft, the drive axis extending perpendicular to a plane containing the plunger axis, a cam mounted on the drive shaft and having an outer circumferential camming surface extending eccentrically around and enclosing the drive axis such that the drive axis extends through the cam, and a follower disposed within the housing drive chamber and attached to the plunger, the follower having an elliptical opening defined by an enclosed inner surface, the cam being disposed within the follower opening such that the camming surface slides along and directly against the follower elliptical inner surface as the cam pushes the follower to reciprocate along the plunger axis when the drive shaft rotates the cam about the drive axis.

2. The pump assembly as recited in claim 1 further comprising a battery electrically connected with the motor and mounted on the motor or on the housing, the battery providing electrical energy to the motor such that the pump assembly operates without connection to a power source separate from the pump assembly.

3. The pump assembly as recited in claim 2 wherein the battery is removably attached to the motor.

4. The pump assembly as recited in claim 1 further comprising a control configured to operate the motor and a transceiver configured to communicate with the control and to wirelessly communicate with a remote computer.

5. The pump assembly as recited in claim 1 wherein:

the housing includes a housing lower member providing the lubricant chamber and a housing upper member providing the drive chamber and being releasably connected with the housing lower member; and the drive mechanism further includes a coupler having a first end attached to the follower and a second end releasably connected with the plunger, the coupler extending through an opening in the housing upper member and into the housing lower member.

6. The pump assembly as recited in claim 5 wherein:

the housing upper member includes a tubular body, the tubular body having a hollow interior providing the drive chamber, two opposing open axial ends and at least one opening extending through a side of the tubular body, a cover enclosing one of the axial ends of the body and an adapter block attached to the other one of the axial ends of the body and having a central opening;

the housing lower member includes a cylindrical body spaced from the tubular body along the plunger axis, the cylindrical body providing the lubricant chamber and being disposable upon the reservoir cover, and an adapter collar attached to the cylindrical body and releasably connected with the adapter block of the tubular body.

7. The pump assembly as recited in claim 1 wherein:

the housing includes a tubular body, the tubular body having a hollow interior providing the drive chamber, two opposing open axial ends and at least one opening extending through a side of the tubular body, a cover enclosing one of the axial ends of the body and an adapter block attached to the other one of the axial ends of the body and having a central opening;

the drive shaft being disposed within the housing interior and extending through the at least one opening and along an axis perpendicular to the plane containing the plunger axis; and the motor is connected with the tubular body of the housing so as to be disposed externally of the housing drive chamber.

8. The pump assembly as recited in claim 7 wherein the housing further includes a cylindrical body spaced from the tubular body along the plunger axis, the cylindrical body providing the lubricant chamber and being disposable upon the reservoir cover, and an adapter collar attached to the cylindrical body and releasably connected with the adapter block of the tubular body.

9. The pump assembly as recited in claim 7 wherein:

the drive mechanism further includes first and second bearings spaced apart along the drive axis, each bearing including an inner ring mounted on the drive shaft and an outer ring disposed about the inner ring; and the housing further includes first and second tubular bearing housings, the first bearing housing extending through the at least one opening in the tubular body and the second bearing housing extending through another opening in the tubular body aligned with the at least one opening, the outer ring of the first bearing being disposed within and coupled with the first bearing housing and the outer ring of the second bearing being disposed within and coupled with the second bearing housing.

10. The pump assembly as recited in claim 1 wherein the plunger has an upper end connected with the drive mechanism and a lower end disposed within the reservoir storage chamber and the pumping tube assembly further includes:

an elongated tubular body, the tubular body being fixedly connected with the housing and disposed about the plunger so as to define an annular flow passage between the plunger and the tubular body; and a shovel assembly including a circular disk fixedly attached to the lower end of the plunger and having at least one axial opening and an annular valve slidably disposed about the plunger and having at least one axial opening, the valve being disposable against the disk to prevent lubricant flow through the at least one disk opening when the plunger displaces in a first, upward direction along the plunger axis and alternatively spaceable from the disk so as to permit lubricant flow through the at least one disk opening and the at least one valve opening when the plunger displaces in a second, downward direction along the plunger axis.

11. The pump assembly as recited in claim 1 wherein the drive mechanism further includes a gear train disposed between the motor and the housing and including an input gear connected with the motor shaft and an output gear connected with the drive shaft.

12. The pump assembly as recited in claim 1 wherein the follower includes a block with first and second vertically-extending sides and two opposing planar faces, the follower opening extending between the two planar faces, and the drive mechanism further includes:

first and second pairs of spaced-apart guide rails disposed within the housing drive chamber, the first side of the follower block being disposed between the first pair of guide rails and the second side of the follower block being slidably disposed against the second pair of guide rails; and first and second bearings spaced apart along the drive axis, each bearing having an inner ring disposed on the drive shaft and an outer ring coupled with the housing, the cam and the follower being disposed between first and second bearings.

13. A reciprocating pump assembly for delivering lubricant from a reservoir, the reservoir having a body defining an interior storage chamber for containing a quantity of lubricant and a cover attached to an upper end of the body, the pump assembly comprising:

a housing mountable on the reservoir cover and having a lubricant chamber with an outlet and a drive chamber spaced from the lubricant chamber;

a drive mechanism disposed at least partially within the housing drive chamber;

an electric motor connected with the housing and having a rotatable shaft coupled with the drive mechanism such that rotation of the motor shaft actuates the drive mechanism; and a pumping tube assembly including an elongated tubular body, the tubular body having an upper end fixedly attached to the housing and a lower end disposable within the reservoir storage chamber, an elongated plunger disposed within the tubular body so as to define a lubricant passage between the plunger and the tubular body, the plunger having a lower end and an upper end coupled with the drive mechanism such that actuation of the drive mechanism reciprocates the plunger along a plunger axis, and a shovel assembly including a circular disk fixedly attached to the lower end of the plunger and having at least one axial opening and an annular valve slidably disposed about the plunger and having at least one axial opening;

wherein the valve is disposable against the disk to prevent lubricant flow through the at least one disk opening when the plunger displaces in a first, upward direction along the plunger axis so as to displace lubricant within the lubricant passage into the lubricant chamber and out of the housing outlet and alternatively spaceable from the disk so as to permit lubricant flow from the reservoir storage chamber through the at least one disk opening and the at least one valve opening and into the lubricant passage when the plunger displaces in a second, downward direction along the plunger axis.

14. The pump assembly as recited in claim 13 further comprising a battery electrically connected with the motor and mounted on the motor or on the housing, the battery providing electrical energy to the motor such that the pump assembly operates without connection to a power source separate from the pump assembly.

15. The pump assembly as recited in claim 13 wherein:

the at least one disk opening in the disk of the shovel assembly is a plurality of the disk axial openings spaced circumferentially about the plunger axis;

the at least one valve opening in the valve of the shovel assembly is a plurality of valve axial openings spaced circumferentially about the plunger axis and the valve has a plurality of closure sections, each closure section being defined between a separate one of a plurality of pairs of adjacent axial openings; and the shovel assembly further includes a guide pin attached to the disk and slidably disposed within a guide opening in the valve such that the guide pin maintains each one of the plurality of valve openings circumferentially offset from each one of the plurality of disk openings of the disk so that each one the valve closure sections extends across one of the disk openings when the valve is disposed against the disk.

16. The pump assembly as recited in claim 15 wherein at least one of:

the shovel assembly further includes a retainer pin attached to the plunger and spaced axially from the disk such that the valve is located between the disk and the retainer pin, the retainer pin limiting axial displacement of the valve along the plunger axis; and the valve disk has an outer circumferential surface and an annular seal disposed about the outer circumferential surface, the annular seal being slidable against an inner circumferential surface of the tubular body of the pumping tube assembly so as to prevent lubricant flow between the outer surface of the disk and the inner surface of the tubular body.

17. A reciprocating pump assembly for delivering lubricant from a reservoir, the reservoir having a body defining an interior storage chamber for containing a quantity of lubricant and a cover attached to an upper end of the body, the pump assembly comprising:

a housing including a housing lower member with a cylindrical body mountable on the reservoir cover and having a lubricant chamber and an outlet and a housing upper member with a tubular body having an interior drive chamber and an adapter block attached to the tubular body, the housing lower member being releasably connected with the adapter block of the housing upper member;

a pumping tube assembly having an upper end connected with the housing and a lower end disposable within the reservoir storage chamber, the pumping tube assembly including an elongated plunger extending through the housing lower member and configured to linearly displace along a plunger axis so as to displace lubricant within the storage chamber to the lubricant chamber of the housing lower member and through the housing outlet;

a drive mechanism disposed at least partially within the housing drive chamber and configured to drive the plunger to reciprocate along the plunger axis;

an electric motor connected with the housing and having a rotatable shaft coupled with the drive mechanism such that rotation of the motor shaft actuates the drive mechanism; and a battery electrically connected with the motor and mounted on the motor or on the housing, the battery providing electrical energy to the motor such that the pump assembly operates without connection to a power source separate from the pump assembly.

18. The pump assembly as recited in claim 17 wherein:

the tubular body of the housing upper member has two opposing open axial ends and at least one opening extending through a side of the tubular body, the housing upper member further including a cover enclosing one of the axial ends of the tubular body and the adapter block being attached to the other one of the axial ends of the body;

the drive mechanism includes a rotatable drive shaft coupled with the motor shaft, the drive shaft being disposed within the housing interior chamber and extending through the at least one opening and along a drive axis perpendicular to a plane containing the plunger axis; and the motor is connected with the tubular body of the housing so as to be disposed externally of the housing drive chamber.

19. The pump assembly as recited in claim 18 wherein the housing lower member further includes an adapter collar attached to the cylindrical body and releasably connected with the adapter block of the tubular housing of the housing upper member.

20. The pump assembly as recited in claim 18 wherein:

the drive mechanism further includes first and second bearings spaced apart along the drive axis, each bearing including an inner ring mounted on the drive shaft and an outer ring disposed about the inner ring; and the tubular body of the housing upper member further includes first and second tubular bearing housings, the first bearing housing extending through the at least one opening in the tubular body and the second bearing housing extending through another opening in the tubular body aligned with the at least one opening, the outer ring of the first bearing being disposed within and coupled with the first bearing housing and the outer ring of the second bearing being disposed within and coupled with the second bearing housing.

21. A reciprocating pump assembly for delivering lubricant from a reservoir, the reservoir having a body defining an interior storage chamber for containing a quantity of lubricant and a cover attached to an upper end of the body, the pump assembly comprising:

a housing mountable on the reservoir cover and having a lubricant chamber with an outlet and a drive chamber spaced from the lubricant chamber;

a pumping tube assembly having an upper end coupled with the housing and a lower end disposable within the reservoir storage chamber, the pumping tube assembly including an elongated plunger configured to linearly displace along a plunger axis so as to displace lubricant within the storage chamber to the housing lubricant chamber and through the housing outlet;

a drive mechanism disposed at least partially within the housing drive chamber and configured to drive the plunger to reciprocate along the plunger axis;

an electric motor connected with the housing and having a rotatable shaft coupled with the drive mechanism such that rotation of the motor shaft actuates the drive mechanism; and a battery electrically connected with the motor and mounted on the motor or on the housing, the battery providing electrical energy to the motor such that the pump assembly operates without connection to a power source separate from the pump assembly;

wherein the housing includes a tubular body, the tubular body having a hollow interior providing the drive chamber, two opposing open axial ends and at least one opening extending through a side of the tubular body, a cover enclosing one of the axial ends of the body and an adapter block attached to the other one of the axial ends of the body and having a central opening;

wherein the drive mechanism includes a rotatable drive shaft coupled with the motor shaft, the drive shaft being disposed within the housing interior and extending through the at least one opening and along an axis perpendicular to a plane containing the plunger axis; and wherein the motor is connected with the tubular body of the housing so as to be disposed externally of the housing drive chamber.

22. A reciprocating pump assembly for delivering lubricant from a reservoir, the reservoir having a body defining an interior storage chamber for containing a quantity of lubricant and a cover attached to an upper end of the body, the pump assembly comprising:

a housing mountable on the reservoir cover and having a lubricant chamber with an outlet and a drive chamber spaced from the lubricant chamber;

a pumping tube assembly having an upper end coupled with the housing and a lower end disposable within the reservoir storage chamber, the pumping tube assembly including an elongated plunger configured to linearly displace along a plunger axis so as to displace lubricant within the storage chamber to the housing lubricant chamber and through the housing outlet;

a drive mechanism disposed at least partially within the housing drive chamber and configured to drive the plunger to reciprocate along the plunger axis;

an electric motor connected with the housing and having a rotatable shaft coupled with the drive mechanism such that rotation of the motor shaft actuates the drive mechanism; and a battery electrically connected with the motor and mounted on the motor or on the housing, the battery providing electrical energy to the motor such that the pump assembly operates without connection to a power source separate from the pump assembly;

wherein the plunger has an upper end connected with the drive mechanism and a lower end disposed within the reservoir chamber; and wherein the pumping tube assembly further includes an elongated tubular body, the tubular body being fixedly connected with the housing and disposed about the plunger so as to define an annular flow passage between the plunger and the tubular body, and a shovel assembly including a circular disk fixedly attached to the lower end of the plunger and having at least one axial opening and an annular valve slidably disposed about the plunger and having at least one axial opening, the valve being disposable against the disk to prevent lubricant flow through the at least one disk opening when the plunger displaces in a first, upward direction along the plunger axis and alternatively spaceable from the disk so as to permit lubricant flow through the at least one disk opening and the at least one valve opening when the plunger displaces in a second, downward direction along the plunger axis.

* * * * *